United States Patent
Sasai et al.

(10) Patent No.: US 10,834,397 B2
(45) Date of Patent: Nov. 10, 2020

(54) IMAGE CODING METHOD AND IMAGE DECODING METHOD

(71) Applicant: Sun Patent Trust, New York, NY (US)

(72) Inventors: Hisao Sasai, Osaka (JP); Takahiro Nishi, Nara (JP); Youji Shibahara, Tokyo (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/718,673

(22) Filed: Dec. 18, 2019

(65) Prior Publication Data

US 2020/0128244 A1    Apr. 23, 2020

Related U.S. Application Data

(63) Continuation of application No. 16/263,463, filed on Jan. 31, 2019, now Pat. No. 10,554,973, which is a
(Continued)

(30) Foreign Application Priority Data

Apr. 13, 2010    (JP) .................................. 2010-092679

(51) Int. Cl.
*H04N 19/117*    (2014.01)
*H04N 19/176*    (2014.01)
(Continued)

(52) U.S. Cl.
CPC ......... *H04N 19/117* (2014.11); *H04N 19/122* (2014.11); *H04N 19/176* (2014.11);
(Continued)

(58) Field of Classification Search
CPC .... H04N 19/117; H04N 19/513; H04N 19/86; H04N 19/18; H04N 19/122; H04N 19/176
See application file for complete search history.

(56) References Cited

U.S. PATENT DOCUMENTS 7,747,094 B2    6/2010    Sekiguchi et al.
8,311,110 B2   11/2012    Alshina et al.
(Continued)

FOREIGN PATENT DOCUMENTS

CN    1450497       10/2003
CN    101938657    1/2011
(Continued)

OTHER PUBLICATIONS

Chinese Office Action dated Nov. 3, 2014 in corresponding Chinese patent application No. 201180018525.2 (with partial English translation).
(Continued)

*Primary Examiner* — James M Pontius
(74) *Attorney, Agent, or Firm* — Wenderoth, Lind & Ponack, L.L.P.

(57) ABSTRACT

An image coding method for coding an input image per block to generate a coded image signal includes: predicting for each prediction unit which is an area obtained by partitioning a target block to generate a prediction image of the target block; comparing a transform unit which is an area obtained by partitioning the target block and is a processing unit for frequency transform with the prediction unit, to detect part of a boundary of the prediction unit, the boundary being located within the transform unit; performing boundary filtering on the detected part of the boundary in the generated prediction image; calculating a difference between a filtered prediction image and the input image to generate a difference image of the target block; and performing frequency transform on the difference image for each transform unit.

14 Claims, 39 Drawing Sheets

Related U.S. Application Data continuation of application No. 15/854,936, filed on Dec. 27, 2017, now Pat. No. 10,237,553, which is a continuation of application No. 15/198,288, filed on Jun. 30, 2016, now Pat. No. 9,906,791, which is a continuation of application No. 13/639,524, filed as application No. PCT/JP2011/002164 on Apr. 12, 2011, now Pat. No. 9,445,129.

(51) Int. Cl.
*H04N 19/122* (2014.01)
*H04N 19/18* (2014.01)
*H04N 19/86* (2014.01)
*H04N 19/513* (2014.01)

(52) U.S. Cl.
CPC .......... *H04N 19/18* (2014.11); *H04N 19/513* (2014.11); *H04N 19/86* (2014.11)

(56) References Cited

U.S. PATENT DOCUMENTS

| | | | |
|---|---|---|---|
| 8,422,550 B2 | 4/2013 | Li | |
| 8,538,179 B2 | 9/2013 | Shimauchi | |
| 8,611,420 B2 | 12/2013 | Alshina et al. | |
| 8,649,435 B2 | 2/2014 | Alshina et al. | |
| 8,824,549 B2 | 9/2014 | Alshina et al. | |
| 8,837,590 B2 | 9/2014 | Alshina et al. | |
| 8,879,626 B2 | 11/2014 | Alshina et al. | |
| 8,902,979 B2 | 12/2014 | Alshina et al. | |
| 9,906,791 B2 | 2/2018 | Sasai et al. | |
| 9,906,795 B2 * | 2/2018 | Sekiguchi | H04N 19/14 |
| 10,237,553 B2 | 3/2019 | Sasai | |
| 2004/0184666 A1 | 9/2004 | Sekiguchi et al. | |
| 2004/0268329 A1 | 12/2004 | Prakasam | |
| 2005/0046702 A1 | 3/2005 | Katayama et al. | |
| 2005/0078750 A1 | 4/2005 | Shen et al. | |
| 2005/0111542 A1 | 5/2005 | Hattori | |
| 2005/0206785 A1 | 9/2005 | Swan et al. | |
| 2006/0204115 A1 | 9/2006 | Burazerovic | |
| 2008/0089417 A1 | 4/2008 | Bao et al. | |
| 2009/0003447 A1 | 1/2009 | Christofferson et al. | |
| 2009/0207911 A1 | 8/2009 | Minamoto | |
| 2010/0080472 A1 | 4/2010 | Asano | |
| 2010/0128995 A1 | 5/2010 | Drugeon et al. | |
| 2010/0284467 A1 | 11/2010 | Sekiguchi et al. | |
| 2010/0329361 A1 * | 12/2010 | Choi | H04N 19/46 375/240.29 |
| 2011/0103475 A1 | 5/2011 | Alshina et al. | |
| 2012/0147957 A1 | 6/2012 | Alshina et al. | |
| 2013/0058401 A1 * | 3/2013 | Song | H04N 19/176 375/240.03 |
| 2013/0077686 A1 | 3/2013 | Alshina et al. | |
| 2013/0083849 A1 | 4/2013 | Alshina et al. | |
| 2013/0083850 A1 | 4/2013 | Alshina et al. | |
| 2013/0266061 A1 * | 10/2013 | An | H04N 19/86 375/240.02 |
| 2014/0105287 A1 | 4/2014 | Alshina et al. | |
| 2014/0105296 A1 | 4/2014 | Alshina et al. | |
| 2014/0192904 A1 | 7/2014 | Rosewarne | |
| 2014/0219343 A1 | 8/2014 | Park | |
| 2014/0301449 A1 | 10/2014 | Oh | |
| 2015/0016525 A1 | 1/2015 | Alshina et al. | |
| 2015/0350652 A1 | 12/2015 | Nellore | |
| 2015/0373366 A1 * | 12/2015 | He | H04N 19/90 375/240.16 |
| 2017/0064307 A1 * | 3/2017 | Jang | H04N 19/593 |
| 2017/0244971 A1 * | 8/2017 | Sekiguchi | H04N 19/176 |
| 2017/0289566 A1 * | 10/2017 | He | H04N 19/52 |

FOREIGN PATENT DOCUMENTS

| | | |
|---|---|---|
| JP | 2005-123732 | 5/2005 |
| JP | 2009-194617 | 8/2009 |
| JP | 2010-507286 | 3/2010 |
| JP | 2010-081368 | 4/2010 |
| WO | 03/003749 A1 | 1/2003 |
| WO | 2008/048864 A2 | 4/2008 |
| WO | 2010/002214 A2 | 1/2010 |

OTHER PUBLICATIONS

International Search Report dated Jul. 12, 2011 in International (PCT) Application No. PCT/JP2011/002164.
ISO/IEC 14496-10 (MPEG-4 Part 10: Advanced Video Coding), Oct. 1, 2004.

* cited by examiner

| Partition method | Minimum partition width | Partitioned shape | Transform processing unit |
|---|---|---|---|
| 8×8 | 8 | (a) of FIG. 2 | 8×8 |
| 4×4 | 4 | (b) of FIG. 2 | 4×4 |
| 8×4 | 4 | (c) of FIG. 2 | 8×8 |
| 4×8 | 4 | (d) of FIG. 2 | 8×8 |

FIG. 8
(a)
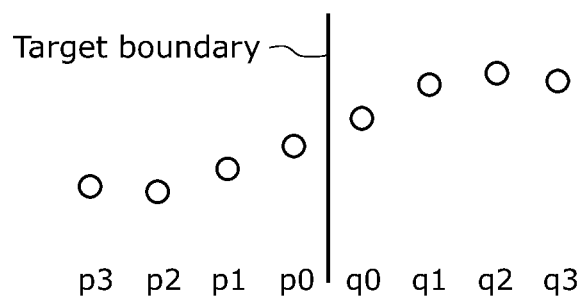
(b)
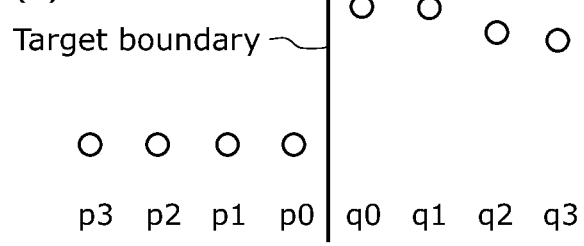
(c)
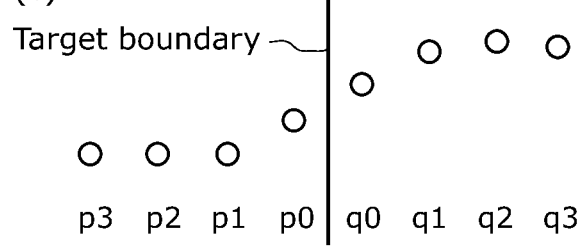

FIG. 21

| Boundary adjacent pixel determination | Filtering method | Filter strength | Filter coefficient | Code |
|---|---|---|---|---|
| Offset = 20 | Overlap type | Strong | — | 0 |
| 4 adjacent pixel fixing | Filter tap type | Strong | — | 1 |
| TH = 10 | Filter tap type | Weak | — | 2 |
| 2 adjacent pixel fixing | Overlap type | — | da = 0.2 | 3 |

FIG. 29

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
Stream of TS packets
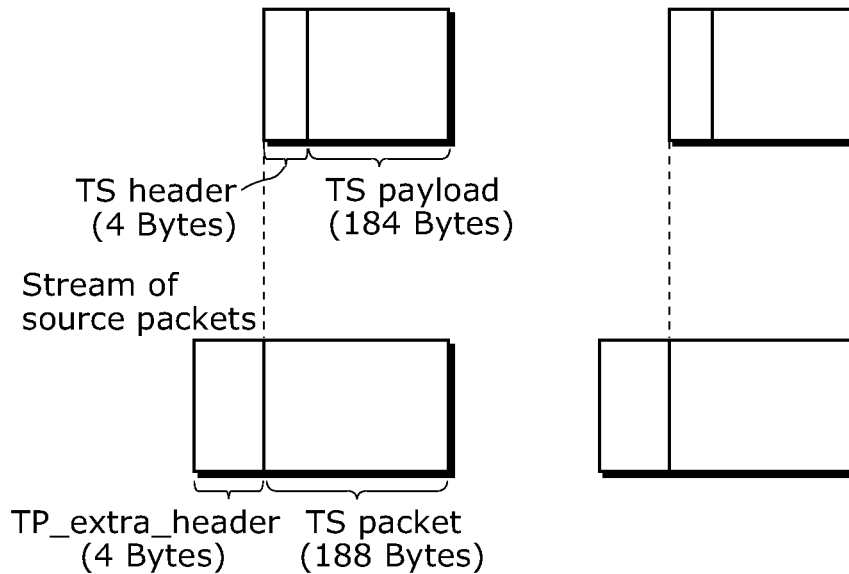
Multiplexed data
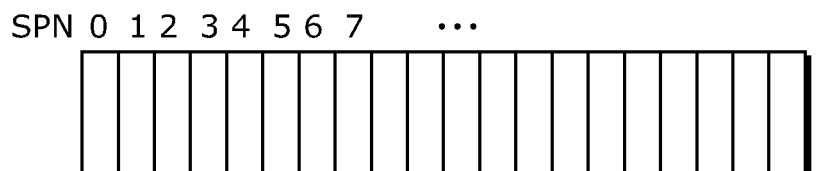
Source packet
FIG. 33
Data structure of PMT
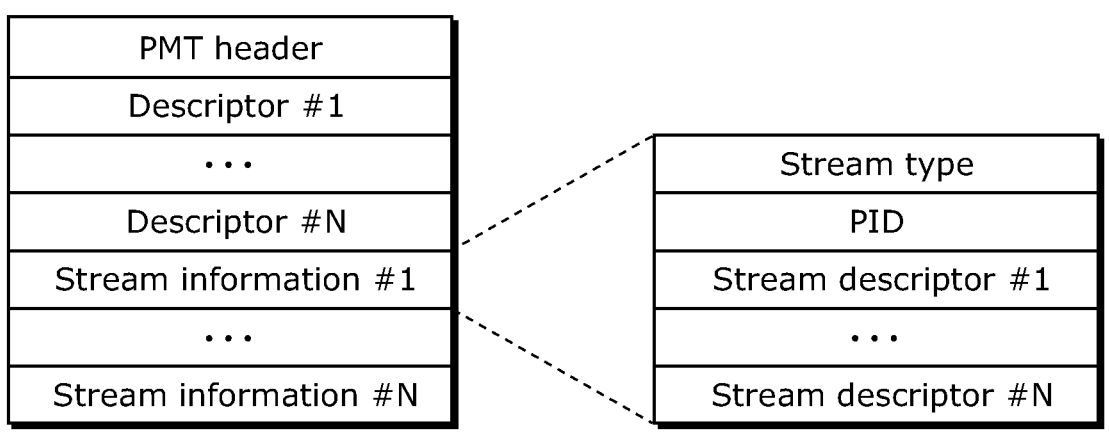

IMAGE CODING METHOD AND IMAGE DECODING METHOD

TECHNICAL FIELD

The present invention relates to an image coding method for compressing and coding a moving image signal by performing frequency transform and quantization on a difference signal between an input image and a prediction image, and an image decoding method for decoding the moving picture signal that has been compressed and coded in such a manner.

BACKGROUND ART

In the conventional image coding standards represented by International Telecommunication Union Telecommunication Standardization Sector (ITU-T) standards denoted with H. 26x and International Organization for Standardization/International Electrotechnical Commission (ISO/IEC) standards denoted with MPEG-x, a picture is partitioned into predetermined units and coding is performed on each of the partitioned units. For example, in the H. 264/MPEG-4 AVC standard (for example, refer to Non Patent Literature 1), a screen (picture) is processed by a unit of horizontal 16 pixels and vertical 16 pixels, which is referred to as a macroblock. When motion compensation is performed, data can be compressed after a macroblock is partitioned into blocks (each of the blocks is composed of a minimum unit of horizontal 4 pixels×vertical 4 pixels), motion compensation is performed on each of the blocks with a different motion vector, frequency transform is performed on a difference signal that is a difference with an original signal, the difference signal is collected into a low frequency range and quantization is performed on the difference signals. Generally, a transform block size having a large size is advantageous because correlation can be more effectively used.

CITATION LIST

Non Patent Literature

NPL 1

ISO/IEC 14496-10 "MPEG-4 Part 10 Advanced Video Coding"

SUMMARY OF INVENTION

In the conventional standards, however, a macroblock is partitioned into small blocks and motion compensation is performed on each of the small blocks. Frequency transform is performed on each of the partitioned small blocks. More specifically, for example, when a macroblock is partitioned into small blocks each composed of a unit of small block of horizontal 4 pixels×vertical 4 pixels, motion compensation and frequency transform are performed by a unit of horizontal 4 pixels×vertical 4 blocks. In this case, only correlation within a limited space can be used and it is difficult to collect the difference signals into a low frequency range by frequency transform. Therefore, there is a problem that efficiency for reducing data amount by quantization is decreased, with a result that coding efficiency is decreased.

Meanwhile, when a block size for frequency transform is set to be larger than a block size for motion compensation, a boundary of block for motion compensation is included in the block of frequency transform. In this case, since a steep edge is generated in a boundary of the motion compensation block, it is difficult to collect the difference signal into a low frequency range by frequency transform. Therefore, as described above, there is a problem that efficiency for reducing data by quantization is decreased, with a result that coding efficiency is decreased.

Therefore, the present invention is conceived to solve the above mentioned problem, and has an object to provide an image coding method and an image decoding method for increasing coding efficiency when a prediction image of a target block is generated by performing prediction process on a prediction unit which is an area obtained by partitioning the target block.

In order to solve the above described problem, an image coding method according to an aspect of the present invention is an image coding method for coding an input image per block to generate a coded image signal, the image coding method including: performing prediction process on prediction units each of which is an area obtained by partitioning a target block, to generate a prediction image of the target block; comparing, with one of the prediction units, a corresponding one of transform units each of which is an area obtained by partitioning the target block and is a processing unit of frequency transform, to detect part of a boundary of the prediction unit, the boundary being located within the transform unit; performing boundary filtering process on the detected part of the boundary of the prediction unit in the generated prediction image; calculating a difference between the prediction image after the filtering process and the input image, to generate a difference image of the target block; and performing frequency transform on the difference image for each of the transform units.

In this way, even if there is a part of a boundary of the prediction unit within the transform unit, filtering process can be performed on the part of the boundary. With this, it is possible to smooth rapid variations which occur in the part of the boundary of the prediction unit and to decrease a value of the difference image between the input image and the prediction image. Moreover, as similarly to the conventional standards, since it is not necessary to make the transform unit smaller such that there is no boundary within the transform unit, it is possible to extend the transform unit even if the prediction unit is small. As a result, since it is possible to significantly reduce a coding amount, it is possible to increase coding efficiency.

Moreover, in order to solve the above described problem, an image decoding method according to an aspect of the present invention is an image decoding method for decoding a coded image signal obtained by coding an image per block, the image decoding method including: performing inverse transform for transform units each of which is an area obtained by partitioning a target block, to generate a decoded difference image of the target block; performing prediction process on prediction units each of which is an area obtained by partitioning the target block, to generate a prediction image of the target block; comparing one of the transform units with a corresponding one of the prediction units to detect part of a boundary of the prediction unit, the boundary being located within the transform unit; performing a boundary filtering process on the detected part of the boundary of the prediction unit in the generated prediction image; and adding the prediction image after the filtering process and the decoded difference image to generate a decoded image of the target block.

With this, it is possible to decode a coded image signal which is coded by the above described image coding method.

It should be noted that the present invention may be implemented as an image coding apparatus which includes processing units each of which performs a corresponding one of the steps included in the above described image coding method. Moreover, the present invention may be implemented as an image decoding apparatus which includes processing units each of which performs a corresponding one of the steps included in the above described image decoding method.

With the present invention, it is possible to increase coding efficiency by performing filtering process on a part of the boundary of the prediction unit located within the transform unit.

BRIEF DESCRIPTION OF DRAWINGS

FIG. 8 is a diagram for explaining filtering process.

FIG. 21 is a schematic view for explaining an example of how to describe filter information on the code sequence.

FIG. 29 is a diagram showing a structure of multiplex data.

FIG. 32 is a diagram showing a structure of TS packets and source packets in the multiplexed data.

FIG. 33 is a diagram showing a data structure of a PMT.

DETAILED DESCRIPTION OF INVENTION

Embodiment 1

Figure 1A:
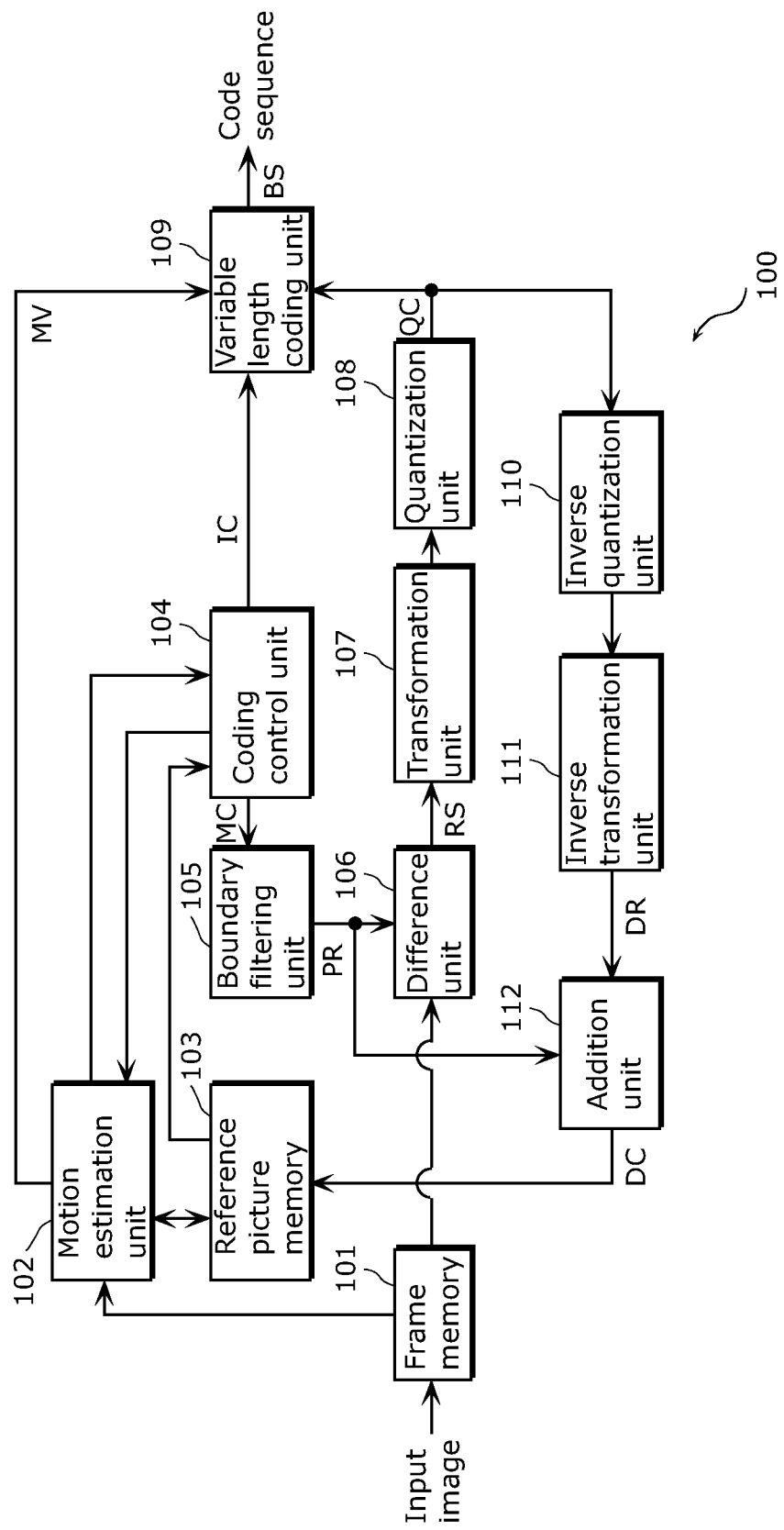
FIG. 1A is a block diagram showing a functional configuration of an image coding apparatus according to Embodiment 1 of the present invention.

FIG. 1A is a block diagram showing a functional configuration of an image coding apparatus 100 according to Embodiment 1 of the present invention. The image coding apparatus 100 codes an input image for each of the blocks to generate a coded image signal.

As shown in FIG. 1A, the image coding apparatus 100 includes a frame memory 101, a motion estimation unit 102, a reference picture memory 103, a coding control unit 104, a boundary filtering unit 105, a difference unit 106, a transformation unit 107, a quantization unit 108, a variable length coding unit 109, an inverse quantization unit 110, an inverse transformation unit 111, and an addition unit 112.

The frame memory 101 holds an input image. Moreover, the reference picture memory 103 holds a reconstructed image. It should be noted that the frame memory 101 and the reference picture memory 103 may be an external memory connected to the image coding apparatus 100. In other words, the image coding apparatus 100 does not have to include the frame memory 101 and the reference picture memory 103. Moreover, the image coding apparatus 100 does not have to include, as a separate memory, each of the frame memory 101 and the reference picture memory 103. For example, the frame memory 101 and the reference picture memory 103 may be configured by sharing a memory.

The motion estimation unit 102 performs motion estimation for each of the prediction units to obtain a motion vector MV for each of the prediction units. Here, the prediction unit is an area which is obtained by partitioning the target block, and is a processing unit of the prediction. The obtained motion vector MV is output to the coding control unit 104 and the variable length coding unit 109.

The coding control unit 104 performs motion compensation on each of the prediction units based on the obtained motion vector, to generate a motion compensated image of the target block as a prediction image. More specifically, the coding control unit 104 first, for each prediction unit, reads a reference image from the reference picture memory 103 based on the motion vector of the prediction unit. Then, the coding control unit 104 merges the read reference images each corresponding to one of the prediction units to generate the motion compensated image.

In this way, a prediction image is generated by the motion estimation unit 102 and the coding control unit 104. In other words, the motion estimation unit 102 and the coding control unit 104 perform prediction process on each of the prediction units to generate the prediction image of the target block.

Moreover, the coding control unit 104 outputs the generated prediction image (motion compensated image) MC to the boundary filtering unit 105. Furthermore, the coding control unit 104 generates a partition method IC for obtaining a prediction unit by partitioning the target block, and then outputs IC to the variable length coding unit 109.

The boundary filtering unit 105 compares the transform unit with the prediction unit to detect a part of a boundary of the prediction unit which is located within the transform unit. The boundary filtering unit 105 performs filtering process on the part of the detected boundary of the prediction unit in the generated prediction image.

Here, the transform unit is an area which is obtained by partitioning the target block, and is a processing unit of the frequency transform. Moreover, the filtering process on the boundary is a processing for correcting a pixel value for a pixel adjacent to the boundary to smooth variations in pixel value in a direction perpendicular to the boundary.

It should be noted that it is favorable that the boundary filtering unit 105 does not perform filtering process on the boundary of the transform unit. In other words, it is favorable that the boundary filtering unit 105 does not perform filtering process on the boundary overlapping with the boundary of the transform unit, even if it is the boundary of the prediction unit. This is because generally, deblocking filtering is performed on the boundary of the transform unit when the reference picture is generated.

A filtered prediction image PR is output to the difference unit 106 and the addition unit 112.

The difference unit 106 calculates a difference between the filtered prediction image and the input image to generate a difference image of the target block. More specifically, the difference unit 106 calculates, for each of the pixels of the target block, a difference value in pixel value between the filtered prediction image and the input image, and generates a difference image which holds the calculated difference value as the pixel value. Then, the difference image RS is output to the transformation unit 107.

The transformation unit 107 performs frequency transform on the difference image for each of the transform units. The frequency transform is, for example, orthogonal transform represented by Discrete Cosine Transform (DCT). Transform coefficients generated in the frequency transform are output to the quantization unit 108.

The quantization unit 108 performs quantization on the transform coefficients generated by the frequency transform to generate quantized coefficients QC. The generated quantized coefficients QC are output to the variable length coding unit 109 and the inverse quantization unit 110.

The variable length coding unit 109 performs variable length coding on the quantized coefficients QC, the motion vector MV, and the partition method IC to generate a coded image signal.

The inverse quantization unit 110 performs inverse quantization on the quantized coefficients generated by the quantization unit 108. Moreover, the inverse transformation unit 111 performs inverse frequency transform on the result of inverse quantization by the inverse quantization unit 110, to generate a decoded difference image. Then, the decoded difference image DR generated in this way is output to the addition unit 112.

The addition unit 112 adds the decoded difference image and the prediction image to generate a reconstructed image. Then, the reconstructed image DC generated in this way is output to the reference picture memory 103. In other words, the reconstructed image DC is held in the reference picture memory 103 to be used as the reference image when the subsequent pictures are coded.

Next, an image coding method performed by the above configured image coding apparatus 100 will be described.

Figure 1B:
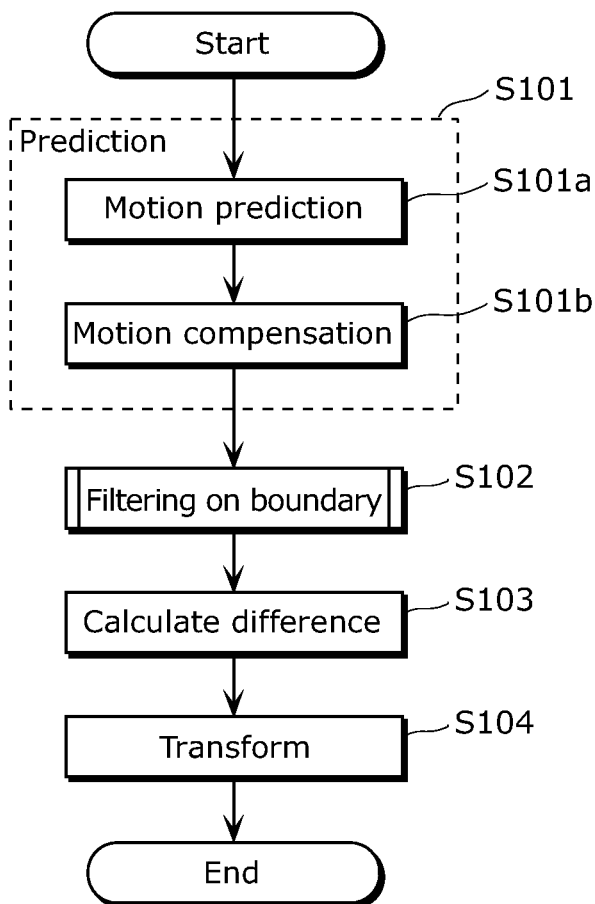
FIG. 1B is a flowchart showing a flow of processing in the image coding method according to Embodiment 1 of the present invention.

FIG. 1B is a flowchart showing a flow of processing in the image coding method according to Embodiment 1 of the present invention.

Before the flowchart shown in FIG. 1B is started, the input image is held in the frame memory 101. Moreover, a decoded image of the coded image (reconstructed image) is already stored in the reference picture memory 103, and the reconstructed image is used as a reference picture when the target block is coded.

The target block which is held in frame memory 101 is partitioned into prediction units according to a partition method instructed by the coding control unit 104. Hereinafter, the prediction unit is referred to as a partitioned area.

Figure 2:
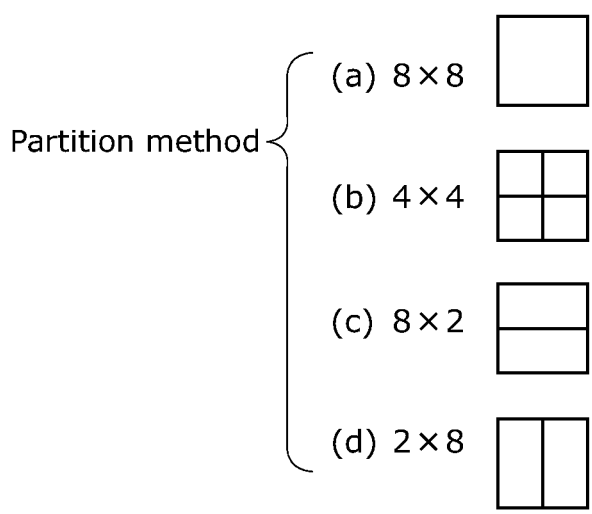
FIG. 2 is a diagram showing an example of a method for partitioning the target block.

FIG. 2 is a diagram showing an example of a method for partitioning the target block according to Embodiment 1 of the present invention.

In the present embodiment, as shown in (a) to (d) of FIG. 2, the target block is partitioned into a partitioned area of 8×8 pixels, 4×4 pixels, 8×2 pixels, or 2×8 pixels. In other words, the partition method instructed by the coding control unit 104 is composed of four types, that is, (a) to (d) of FIG. 2.

In this state, prediction process is performed on each of the partitioned areas and a prediction image of the target block is generated (Step S101). Step S101 corresponds to a prediction step.

More specifically, the motion estimation unit 102 performs motion estimation for each of the partitioned areas to obtain a motion vector for each of the partitioned areas (Step S101a). More specifically, the motion estimation unit 102 performs, for each of the images of the partitioned areas, motion estimation with respect to the reference picture held in the reference picture memory 103. In the motion estimation, in a predetermined range in the reference picture (for example, within a range of a rectangle having plus or minus 32 pixels in a horizontal direction and plus or minus 24 pixels in a vertical direction), a position in the reference picture in which an evaluation value with respect to the image of the partitioned area, for example, is minimum is estimated. The motion estimation unit 102 obtains a motion vector from the position obtained in this way.

Here, the evaluation value is a value for determining the reference image. As the evaluation value, for example, an absolute value sum of differences of pixel values between pixels corresponding to each other can be used. Moreover, as the evaluation value, for example, a weighted sum of the absolute value sum of differences and a code amount of the motion vector and the like can be used.

The motion estimation unit 102, for each of the partition methods, performs motion estimation with respect to an image for each of the partitioned areas, to obtain a motion vector for each of the partitioned areas. Furthermore, the motion estimation unit 102 determines the optimum partition method (for example, a method in which a sum of the evaluation values with respect to each of the partitioned areas is minimum when the minimum is used as a basis for an optimum value). Then, the motion estimation unit 102 outputs the determined partition method to the coding control unit 104 and outputs the motion vector MV for each of the partitioned areas which is partitioned by a corresponding one of the partition methods to the variable length coding unit 109. Moreover, the determined partition method and the determined motion vector are notified to the coding control unit 104.

Next, the coding control unit 104 generates, as a prediction image, the motion compensated image of the target block based on the motion vector obtained by the motion estimation unit 102 (Step S101b). More specifically, the coding control unit 104 reads the reference picture with respect to each of the partitioned areas from the reference picture memory 103 and merges the read reference images, to generate the prediction image. The generated prediction image MC is output to the boundary filtering unit 105.

Figure 3:
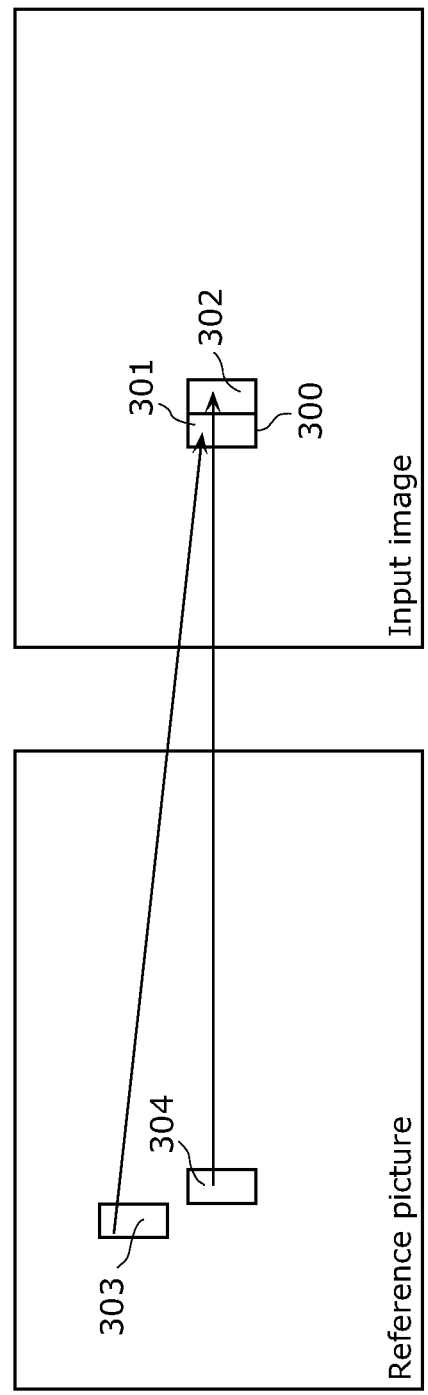
FIG. 3 is a schematic view for explaining motion compensation.

For example, when, in FIG. 3, a target block 300 is partitioned into a partitioned area 301 and a partitioned area 302, the coding control unit 104 obtains a reference image 303 and a reference image 304 from the reference picture, to generate a prediction image of the target block 300 (motion compensated image). The prediction image is processed on a processing block-by-processing block basis (for example, a unit of horizontal 16 pixels and vertical 16 pixels).

Next, the boundary filtering unit 105 performs filtering process on the boundary of the partitioned area in the generated prediction image (Step S102). The operation of the boundary filtering unit 105 will be described with reference to FIGS. 4 to 7 in detail.

Figures 4, 5:
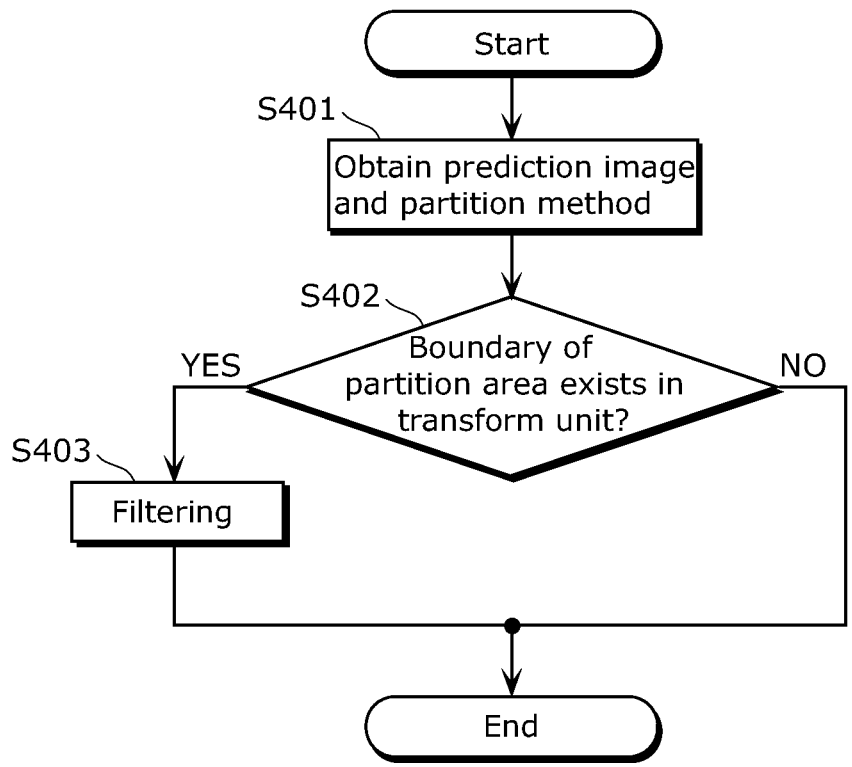
FIG. 4 is a flowchart showing a flow of a boundary filtering process according to Embodiment 1 of the present invention.
FIG. 5 is a diagram showing an example of a transform unit corresponding to a partition method.

FIG. 4 is a flowchart showing a flow of a boundary filtering process according to Embodiment 1 of the present invention. More specifically, FIG. 4 is a flowchart for describing the operation in which the boundary filtering unit 105 performs filtering process on the prediction image based on the partition method obtained from the coding control unit 104.

The boundary filtering unit 105 obtains, from the coding control unit 104, a prediction image MC and the partition method corresponding to the prediction image MC (Step S401).

Next, the boundary filtering unit 105 determines whether or not the boundary of the partitioned area exists within the transform unit (Step S402). In other words, the boundary filtering unit 105 compares the transform unit with the partitioned area, to detect the boundary of the partitioned area which is located within the transform unit (also referred to as target boundary).

More specifically, the boundary filtering unit 105 obtains information about the shape of the partitioned area based on the partition method corresponding to the prediction image MC. Then, the boundary filtering unit 105, for example, as shown in FIG. 5, compares the transform unit which is determined in advance according to the partition method with the partitioned area, and determines whether or not the boundary of the partitioned area exists within the transform unit.

Figure 6:
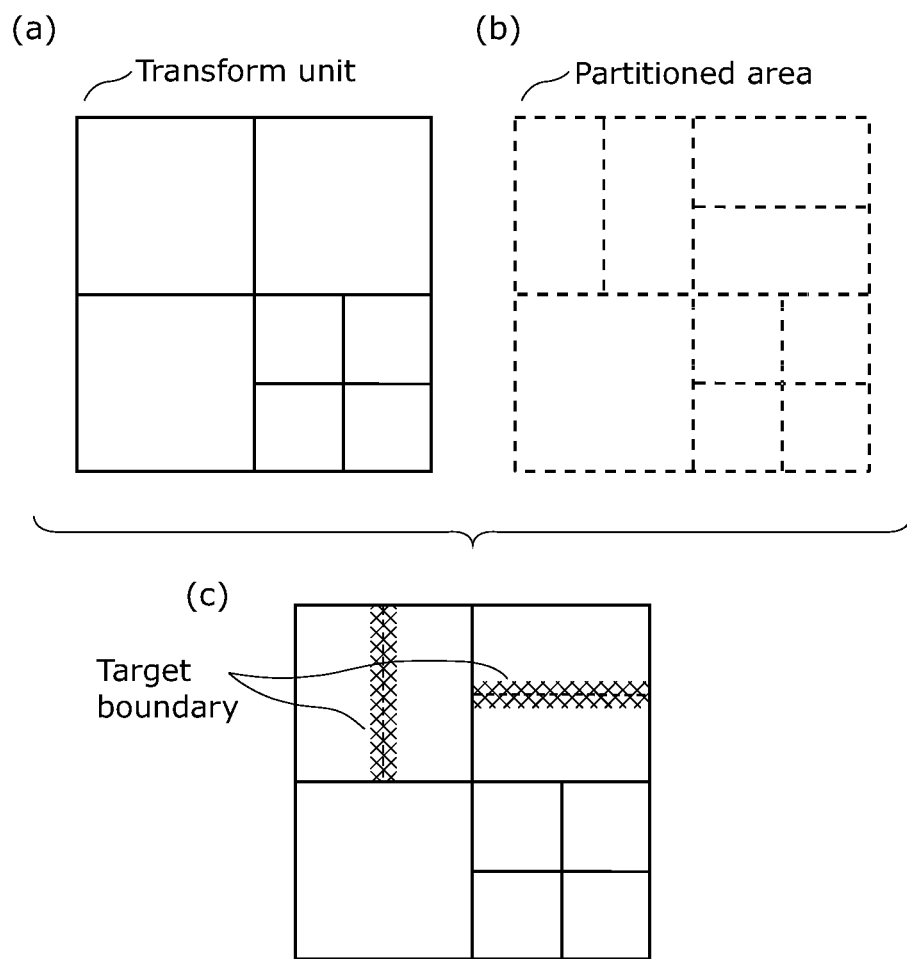
FIG. 6 is a diagram for explaining the target boundary.

With reference to FIG. 6, the comparison process in Step S402 will be described in more detail. FIG. 6 shows, in (a), the boundary of the transform unit in the target block. FIG. 6 shows, in (b), the boundary of the partitioned area in the target block. Moreover, FIG. 6 shows, in (c), the target boundary which is detected by comparison between the boundary of the transform unit and the boundary of the partitioned area. In (c) of FIG. 6, the target boundary is illustrated by hatching.

For example, as shown in FIG. 5, when the partition method corresponds to the transform unit on a one-to-one basis, the boundary filtering unit 105 compares, with the transform unit, the minimum partition width with respect to the partition method. When the minimum partition width is smaller than a length of a side of the transform unit, the boundary filtering unit 105 determines that the boundary of the partitioned area of the reference image MC is generated within the transform unit.

Here, when the target boundary is not detected (No in Step S402), filtering process is not performed on the prediction image of the target block and the boundary filtering process is ended.

Meanwhile, the target boundary is detected (YES in Step S402), the boundary filtering unit 105 performs filtering process on the target boundary (for example, the target boundary shown in (c) of FIG. 6) (Step S403). Here, with reference to FIGS. 7 and 8, the filtering process on the target boundary in Step S403 will be described in detail.

Figure 7:
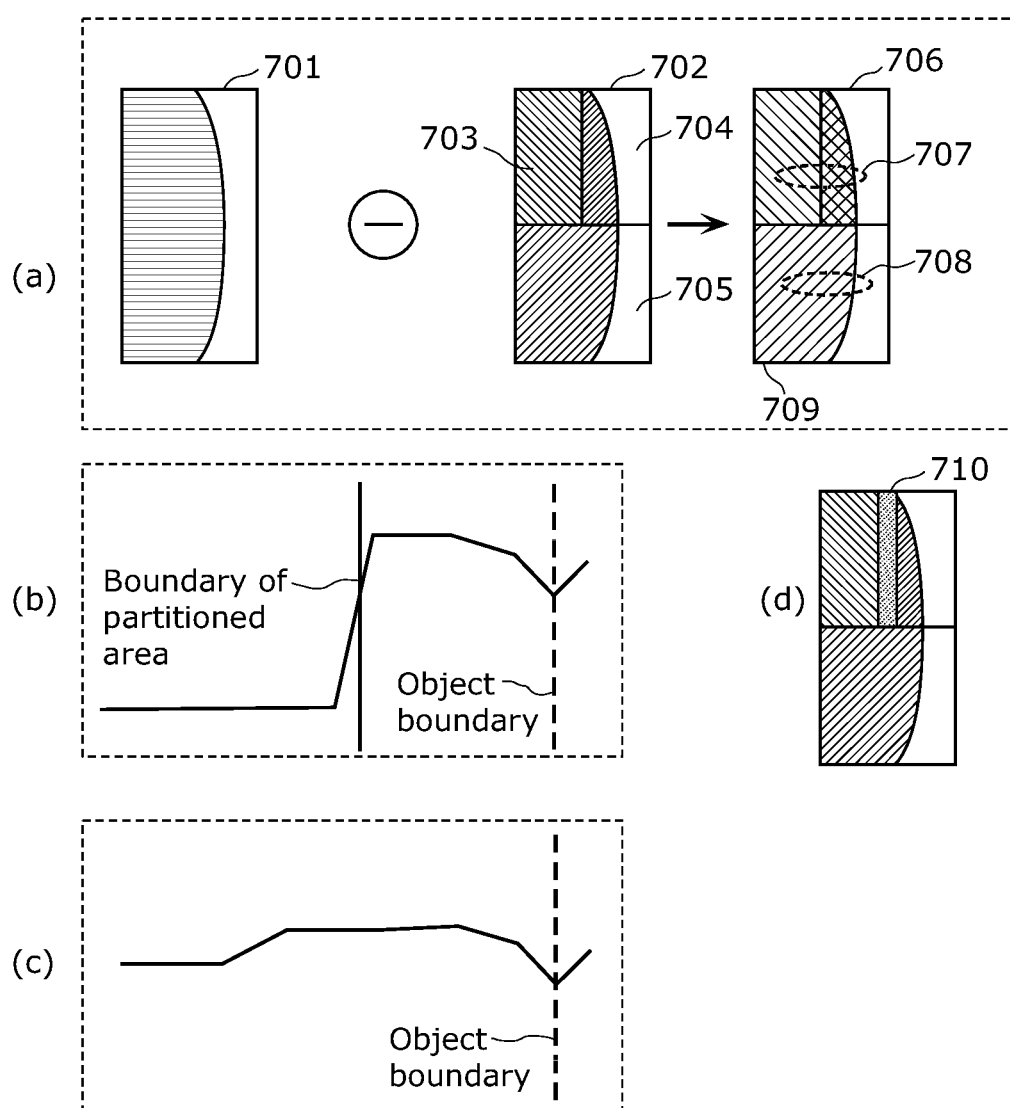
FIG. 7 is a schematic view for explaining characteristics of an image including the target boundary.

FIG. 7 is a schematic view for explaining characteristics of an image including the target boundary.

FIG. 7 shows, in (a), an original image 701, a prediction image 702, and a difference image 706. The original image 701 is an image of the target block which is included in the input image held in the frame memory 101. The prediction image 702 is an image which is obtained by performing motion compensation on each of the partitioned areas 703, 704, and 705. The difference image 706 is an image showing the difference between the original image 701 and the prediction image 702.

As shown in the prediction image 702, when motion compensation is performed on each of the partitioned areas, there is often difference in image characteristics between the partitioned areas 703, 704, and 705. Therefore, in the difference image 706 that is a difference signal between the original image 701 and the prediction image 702, a pixel value of a pixel adjacent to the boundary of the partitioned area tends to be great.

In (b) of FIG. 7, variations in pixel values in a portion 707 which includes an object boundary and crosses a partitioned area in the difference image 706 are shown. Moreover, in (c) of FIG. 7, variations in pixel values in a portion 708 which includes an object boundary like that in the portion 707 and does not cross a partitioned area are shown. In (b) and (c) of FIG. 7, a horizontal axis shows positions of pixels in a direction perpendicular to the boundary of the partitioned area, while a vertical axis shows pixel values.

In (b) of FIG. 7, there are great variations in value caused by the boundary of the partitioned area in the central part and there are small variations in value caused by the object boundary near the right side. In (c) of FIG. 7, there are only small variations in value caused by the object boundary near the right side.

Here, when two areas 709 circled by thick lines shown in (a) of FIG. 7 are each a transform unit, transform is performed on an image having a large difference value as shown in (b) of FIG. 7. In orthogonal transform represented by Discrete Cosine Transform (DCT) for use in image coding, it is possible to efficiently transform an image which is greatly included in a natural image and includes spatial variations in small spatial pixel value (an image which includes spatial variations in pixel value caused by the object boundary of the natural image shown in (c) of FIG. 7). However, it is impossible to efficiently transform an image which includes an edge indicating steep variations in pixel value as shown in (b) of FIG. 7.

Therefore, in Step S402, the boundary filtering unit 105 detects a target boundary 710 shown in (d) of FIG. 7. The boundary filtering unit 105 performs filtering process on an image adjacent to the target boundary 710 in the prediction image. In other words, the boundary filtering unit 105 performs filtering process on the target boundary.

Here, the image which is subject to the filtering process is not a difference image but a prediction image. This is because when the filtering process is performed on the difference image between the input image and the prediction image, it is difficult to restore a component which is lost in the filtering process. For example, when the filtering process is performed such that a frequency component of a frequency higher than a certain level in the difference image is replaced to zero, it is difficult to restore the frequency component of the high frequency which is lost in the filtering process even if quantization is performed with significantly high precision on the filtered difference image. In other words, it is difficult to restore an image similar to the input image.

Meanwhile, when the filtering process is performed on the prediction image, quantization is performed on transform coefficients obtained by frequency transform on the difference image between the filtered prediction image and the input image. Therefore, when quantization is performed with significantly high precision, it is possible to restore an image similar to the input image.

As described above, the filtering process has an object to smooth the steep edge which is not included in the natural image. With reference to FIG. 8, filtering process to be performed on an image adjacent to the target boundary will be described.

FIG. 8 is a diagram for explaining the filtering process. In FIG. 8, pixel values of pixels adjacent to the target boundary are shown. Here, a horizontal axis shows positions of pixels in a direction perpendicular to the target boundary, while a vertical axis shows pixel values. The pixel values of pixel p3, pixel p2, pixel p1, pixel p0, pixel q0, pixel q1, pixel q2, and pixel q3 are p3, p2, p1, p0, q0, q1, q2, and q3, respectively.

In (a) of FIG. 8, pixel values of the input image are shown. In (b) of FIG. 8, pixel values of the prediction image are shown. In (c) of FIG. 8, pixel values of the prediction image on which the filtering process is performed on pixels adjacent to the target boundary in (b) of FIG. 8 are shown.

As shown in (a), (b), and (c) of FIG. 8, the filtered prediction image is closer to the input image compared with the reference image before the filtering process. As a result, since a difference value included in the difference image is small, it is possible to efficiently perform transform and perform efficient coding.

As described above, the boundary filtering unit 105 performs filtering process on the adjacent pixel of the target boundary in a predetermined method for smoothing variations in pixel value. The boundary filtering unit 105 outputs the filtered prediction image PR to the difference unit 106 and the addition unit 112.

The description of FIG. 1B is resumed.

The difference unit 106 calculates a difference value between the pixel values of pixels corresponding each to the input image and the prediction image PR, to generate a residual image RS (Step S103). The residual image RS corresponds to the difference image.

The transformation unit 107 performs frequency transform on the residual image RS (Step S104). The transformation unit 107 outputs the transform coefficients obtained by the frequency transform to the quantization unit 108.

A method for determining the adjacent pixel of the target boundary which is subject to the filtering process will be described in detail in Embodiment 3, while a method for performing filtering process on the adjacent pixel will be described in detail in Embodiment 4.

As described above, the image coding apparatus 100 according to Embodiment 1 of the present invention, when the input image is coded, partitions the input image into blocks (units of coding) each of which is a square area and a processing unit for coding. The image coding apparatus 100 partitions the partitioned blocks further into a plurality of partitioned areas in a predetermined partition method. Then, the image coding apparatus 100 performs motion estimation and motion compensation on each of the partitioned areas to generate a prediction image of the target block. Here, the image coding apparatus 100 detects, as the target boundary, a part of the boundary of the partitioned area which does not match the transform unit which is a processing unit for transform process on the difference signal in the subsequent stage. Then, the image coding apparatus 100 performs filtering process on the target boundary in the prediction image.

With this operation, even when a part of a boundary of a prediction unit (partitioned area) exists within the transform unit, the filtering process can be performed on the part of the boundary. Therefore, it is possible to smooth rapid variations in pixel value which occur in the part of the boundary of the prediction unit and to decrease a value of the difference image between the input image and the prediction image. Moreover, as similarly to the conventional standards, since it is not necessary to make the transform unit smaller such that there is no boundary of the prediction unit (partitioned area) within the transform unit, it is possible to extend the transform unit even when the prediction unit is small. As a result, since it is possible to significantly reduce a code amount, it is possible to increase coding efficiency.

In the present embodiment, the filtering process is performed on only a part of the boundary of the prediction unit which is located within the transform unit. Therefore, processing amount can be reduced compared with the case where the filtering process is performed on the whole of the boundary of the prediction unit. Furthermore, in the decoded image or the reference image, it is possible to reduce the filtering process which overlaps with the process performed on the boundary of the transform unit by a coding distortion removal filter (deblocking filter), and it is possible to reduce degradation in image quality (image blur) caused by a plurality of times of filtering process.

It should be noted that the partition method and the transform unit do not have to be limited to the partition method and the transform unit shown in FIG. 5. For example, even when a part of the prediction unit overlaps with a part of the transform unit, the image coding method according to the present embodiment obtains the effect similar to the above described effect by performing filtering process on the boundary of the prediction unit within the transform unit.

It should be noted that the image coding apparatus 100 according to the present embodiment performs filtering process on the whole of the boundary of the partitioned area within the transform unit. However, it is not necessary to perform the filtering process on the whole of the partitioned area within the transform unit. For example, when a reference image is obtained from an area in which two partitioned areas have the same motion vector and is adjacent to the partitioned areas in a reference picture for each of two partitioned areas, filtering process may be skipped for the boundary between the two partitioned areas. With this, the amount of filtering process can be reduced and an excessive filtering process on the prediction image can be restricted, and degradation in image quality caused by the filtering process (image blur) can be restricted.

It should be noted that the information indicating a skip of the filtering process may be described as stream header information. With this, since ON/OFF of the filter can be controlled according to image characteristics, it is possible to maintain image quality of the decoded image at a high level. It should be noted that how to transmit filter header information will be described in detail in other embodiments.

It should be noted that in the prediction of FIG. 1B (Step S101), intra prediction process may be performed instead of the motion estimation (Step S101a) and the motion compensation (Step S101b). In other words, in the prediction process (Step S101), the coding control unit 104 may perform intra prediction process for each of the prediction units based on the reconstructed image of the already coded block, to generate the intra-prediction image of the target block as the prediction image. In this case, the image coding apparatus 100 does not have to include the motion estimation unit 102.

It should be noted that the image coding apparatus 100 does not necessarily have to include all the processing units shown in FIG. 1A. For example, the image coding apparatus 100 may include only the processing units each of which performs a corresponding one of the steps included in the image coding method shown in FIG. 1B.

Embodiment 2

Figure 9A:
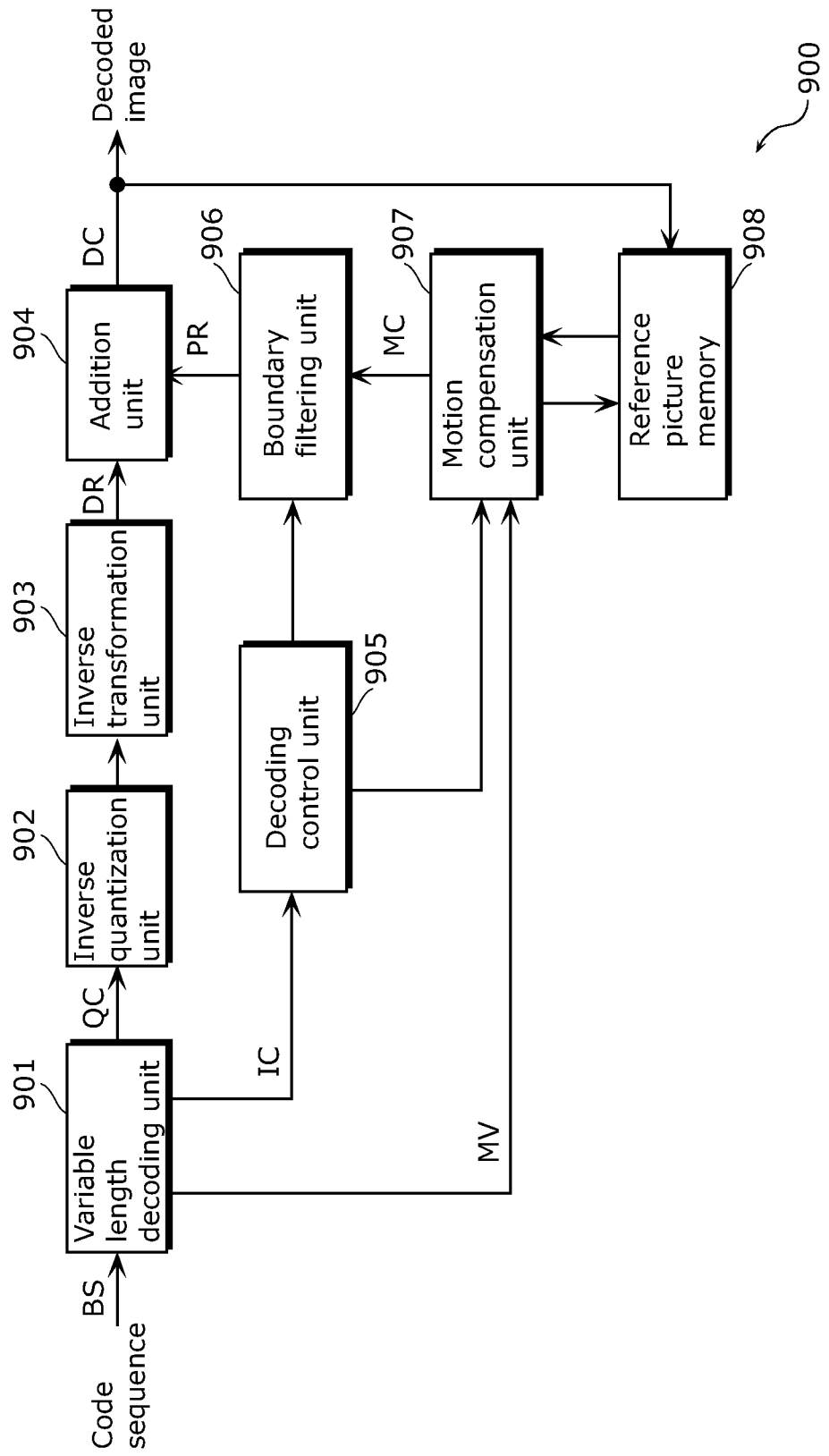
FIG. 9A is a block diagram showing a functional configuration of an image decoding apparatus according to Embodiment 2 of the present invention.

FIG. 9A is a block diagram showing a functional configuration of an image decoding apparatus 900 according to Embodiment 2 of the present invention. The image decoding apparatus 900 decodes a coded image signal in which the target image is coded, to generate a decoded image. The image decoding apparatus 900 includes a variable length decoding unit 901, an inverse quantization unit 902, an inverse transformation unit 903, an addition unit 904, a decoding control unit 905, a boundary filtering unit 906, a motion compensation unit 907, and a reference picture memory 908.

In the present embodiment, an input code sequence BS is determined to be a coded image signal generated by the image coding apparatus 100 according to Embodiment 1 of the present invention. In other words, the input code sequence BS is determined to be a coded image signal in which the input image is coded for each of the blocks.

The reference picture memory 908 holds a reconstructed image that is an already decoded image. It should be noted that the reference picture memory 908 may be an external memory connected to the image decoding apparatus 900. In other words, the image decoding apparatus 900 does not necessarily have to include the reference picture memory 908.

The variable length decoding unit 901 performs variable length decoding on the input code sequence BS to obtain quantized coefficients, a partition method, and a motion vector. The partition method is a method for partitioning the target block into a plurality of prediction units (partitioned areas). The obtained quantized coefficients QC are output to the inverse quantization unit 902, the partition method IC is output to the decoding control unit 905, and the motion vector MV is output to the motion compensation unit 907.

The inverse quantization unit 902 performs inverse quantization on the quantized coefficients. Moreover, the inverse transformation unit 903 performs, for each of the transform units, inverse frequency transform on the result of inverse quantization in the inverse quantization unit 902, to generate a decoded difference image. Then, the decoded difference image DR generated in this way is output to the addition unit 904.

The decoding control unit 905 obtains the partition method IC for the target block, and outputs IC to the boundary filtering unit 906 and the motion compensation unit 907.

The motion compensation unit 907 obtains a partition method for partitioning the target block into prediction units. Furthermore, the motion compensation unit 907 obtains a motion vector for each of the prediction units which are obtained by partitioning according to the obtained partition method. The motion compensation unit 907 performs motion compensation on each of the prediction units based on the obtained motion vector, to generate a motion compensated image of the target block as a prediction image. In other words, the motion compensation unit 907 performs prediction process on each of the prediction units which are areas obtained by partitioning the target block, to generate a prediction image of the target block.

In other words, the motion compensation unit 907 obtains, based on the partition method and the motion vector, the reference image from the reference picture memory 908, to generate a motion compensated image for the target block. Here, when the target block is partitioned, a motion vector is described for each of the partitioned areas (prediction units). Therefore, the motion compensation unit 907, according to the motion vector, obtains a reference image for each of the partitioned areas and generates a motion compensated image by merging the obtained reference images.

For example, as shown in FIG. 3, the target block 300 is partitioned into the partitioned area 301 and the partitioned area 302, the motion compensation unit 907 obtains the reference image 303 and the reference image 304 from the reference picture memory 908, and generates the motion compensated image as a prediction image MC. Then, the motion compensation unit 907 outputs the prediction image MC to the boundary filtering unit 906.

The boundary filtering unit 906 compares the transform unit with the prediction unit to detect a part of a boundary of the prediction unit which is located within the transform unit. The boundary filtering unit 906 performs filtering process on the detected part of the boundary of the prediction unit in the generated prediction image.

It should be noted that the transform unit, for example, may be determined according to a predetermined correspondence relationship between the prediction unit and the transform unit. Moreover, for example, the transform unit may be determined independently of the prediction unit.

The addition unit 904 adds the filtered prediction image and the decoded difference image to generate a decoded image of the target block.

Next, an image coding method performed by the above configured image decoding apparatus 900 will be described.

Figure 9B:
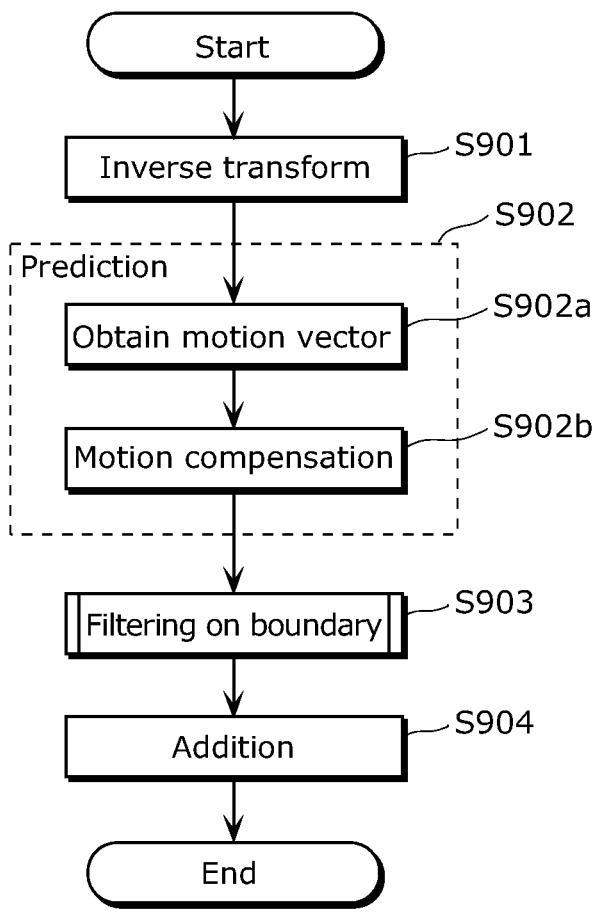
FIG. 9B is a flowchart showing a flow of processing in the image decoding method according to Embodiment 2 of the present invention.

FIG. 9B is a flowchart showing a flow of processing in the image decoding method according to Embodiment 2 of the present invention.

Before the flowchart shown in FIG. 9B is started, a decoded image is already stored in the reference picture memory 908. The decoded image is used as a reference picture when a code sequence is decoded.

First, the inverse transformation unit 903 performs inverse frequency transform on each of the transform units to generate a decoded difference image of the target block (Step S901).

Next, the motion compensation unit 907 performs prediction process on each of the prediction units that are areas obtained by partitioning the target block, to generate the prediction image of the target block (Step S902). More specifically, the motion compensation unit 907 first obtains a motion vector for each of the prediction units (Step S902a). Next, the motion compensation unit 907 performs motion compensation on each of the prediction units based on the obtained motion vector, to generate a motion compensated image of the target block as the prediction image (Step S902b).

The boundary filtering unit 906 performs filtering process on the boundary of the prediction unit in the generated prediction image (Step S903). The operation of the boundary filtering unit 906 will be described with reference to FIG. 10.

Figure 10:
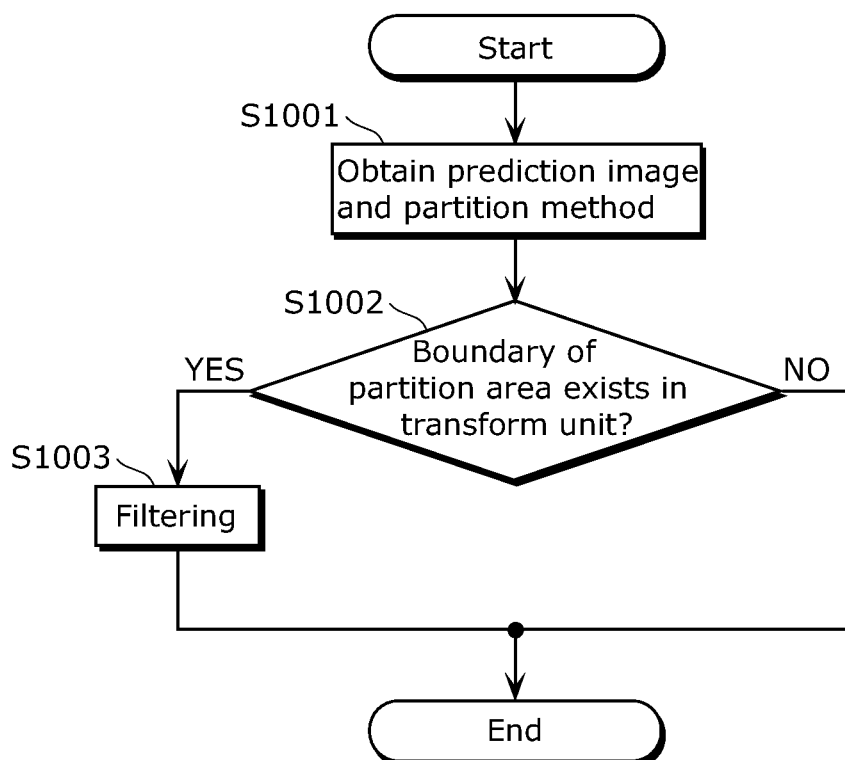
FIG. 10 is a flowchart showing a flow of boundary filtering process according to Embodiment 2 of the present invention.

FIG. 10 is a flowchart showing a flow of boundary filtering process according to Embodiment 2 of the present invention. More specifically, FIG. 10 is a flowchart for explaining the operation in which the boundary filtering unit 906 performs filtering process on the prediction image based on the partition method obtained from the decoding control unit 905.

The boundary filtering unit 906 obtains the prediction image of the target block from the motion compensation unit 907, and further obtains the partition method of the target block from the decoding control unit 905 (Step S1001).

Next, the boundary filtering unit 906 determines whether or not part of the boundary of the partitioned area exists within the transform unit (Step S1002). In other words, the boundary filtering unit 105 compares the transform unit with the partitioned area to detect the part of the boundary of the partitioned area which is located within the transform unit.

More specifically, the boundary filtering unit 906 obtains information about the shape of the partitioned area based on the partition method. The boundary filtering unit 906, for example, as shown in FIG. 5, compares, with the partitioned area, the transform unit which is determined in advance according to the partition method, and determines whether or not the boundary of the partitioned area exists within the transform unit. The comparison process is similar to that described in Step S402 in Embodiment 1, and a detailed description will be omitted.

Here, when the target boundary is not detected (No in Step S1002), filtering process is not performed on the prediction image of the target block and the boundary filtering process is ended.

Meanwhile, when the target boundary is detected (YES in Step S1002), the boundary filtering unit 906 performs filtering process on the target boundary (for example, the target boundary shown in (c) of FIG. 6) (Step S1003). The filtering process in Step S1003 is similar to the filtering process described in Step S403 in Embodiment 1, and a detailed description will be omitted. The boundary filtering unit 105 outputs the filtered prediction image PR to the addition unit 904.

Next, the addition unit 904 adds the decoded difference image DR and the filtered prediction image PR, to generate a decoded image DC of the target block (Step S904). The decoded image DC generated in this way is output to the reference picture memory 908. In other words, the decoded image DC is an output image and a reference picture which is used in the subsequent coding.

As described above, the image decoding apparatus 900 according to Embodiment 2 of the present invention obtains partition information for each of the target blocks when decoding the code sequence generated by the image coding method according to Embodiment 1 of the present invention. The image decoding apparatus 900 performs motion compensation on each of the prediction units according to the partition method, and one of a motion vector which already described in the code sequence or a surrounding motion vector is already decoded, to generate the motion compensated image of the target block as the prediction image. In the prediction image generated in this way, filtering process is performed on the boundary of the partitioned area which is located in the prediction unit. The image decoding apparatus 900 adds the prediction image after the filtering and the decoded difference image to generate a decoded image.

With this operation, the code sequence generated by the image coding method according to Embodiment 1 of the present invention can be accurately decoded.

It should be noted that the partition method and the transform unit do not have to be limited to the partition method and the transform unit shown in FIG. 5. When the boundary of the portioned area is located within the transform unit, the effect similar to the above described effect can be obtained.

It should be noted that the image decoding apparatus 900 according to the present embodiment, as similarly to the image decoding apparatus according to Embodiment 1, performs filtering process on the whole of the boundary of the partitioned area within the transform unit. However, the image decoding apparatus 900 does not necessarily have to perform the filtering process on the whole of the partitioned area within the transform unit. For example, when a reference image is obtained from an area in which two partitioned areas have the same motion vector and is adjacent to the partitioned areas in a reference picture for each of two partitioned areas, filtering process may be skipped for the boundary between the two partitioned areas. With this, the amount of filtering process can be reduced and an excessive filtering process on the prediction image can be restricted, and degradation in image quality caused by the filtering process (image blur) can be restricted.

It should be noted that when the information indicating a skip of the filtering process is described in stream header information, ON/OFF of the filter can be controlled according to image characteristics by coding the information. Therefore, it is possible to maintain image quality of the decoded image at a high level. It should be noted that how to decode filter header information will be described in detail in other embodiments.

It should be noted that a method for determining the adjacent pixel of the target boundary which is subject to filtering process, as similarly to Embodiment 1, will be described in detail in Embodiment 3, while a method for performing filtering process on the adjacent pixel will be described in detail in Embodiment 4.

It should be noted that the image decoding apparatus 900 does not necessarily have to include all the processing units shown in FIG. 9A. For example, the image decoding apparatus 900 may include only the processing units each of which performs a corresponding one of the steps included in the image decoding method shown in FIG. 9B.

Embodiment 3

In Embodiment 3 of the present invention, filtering process on the target boundary in Embodiments 1 and 2 will be described. Especially, a method for determining a filtering process target pixel which is a pixel that is subject to filtering process will be described in detail.

Here, a portion on which filtering process is performed is a boundary of the prediction unit which is located within the transform unit (target boundary). At this time, a method for determining the filtering process target pixel that is a pixel adjacent to the target boundary and is subject to the filtering process will be described with reference to pixels p3, p2, p1, p0, q0, q1, q2, and q3 arranged in a row in the filtering process direction and shown in FIG. 8. It should be noted the pixel values of pixel p3, pixel p2, pixel p1, pixel p0, pixel q0, pixel q1, pixel q2, and pixel q3 are p3, p2, p1, p0, q0, q1, q2, and q3, respectively.

Figure 11:
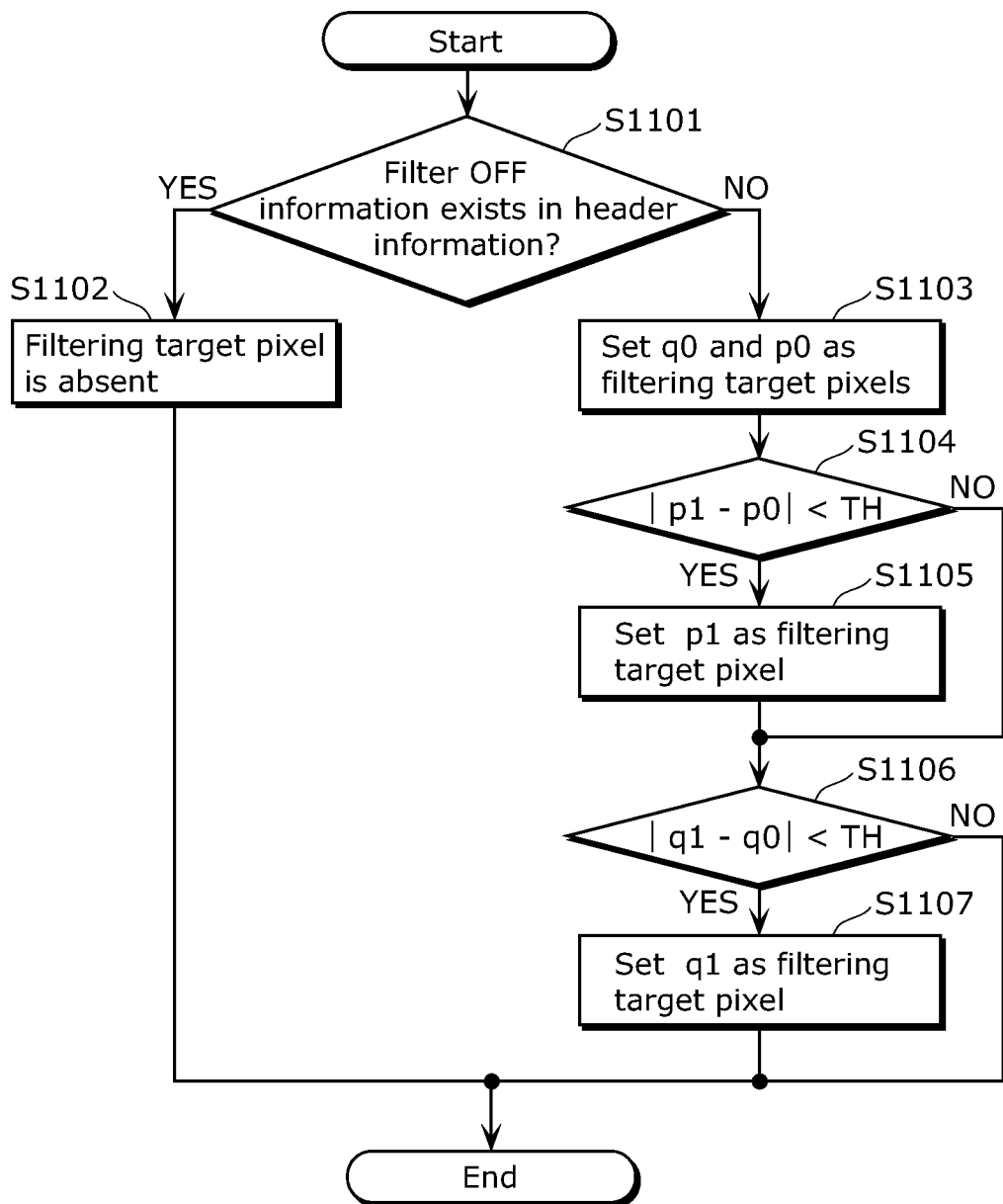
FIG. 11 is a flowchart showing a flow of processing performed by a method for determining a filtering process target pixel according to Embodiment 3 of the present invention.

FIG. 11 is a flowchart showing a flow of processing performed under a method for determining a filtering process target pixel according to Embodiment 3 of the present invention. First, the boundary filtering unit 105 or 906 (hereinafter, the boundary filtering unit 105 will be described on behalf of the boundary filtering unit 906) obtains filter information indicating ON/OFF of the filter which is described in the stream header information. The boundary filtering unit 105 determines whether or not the filter information is information indicating filter OFF (Step S1101).

Here, when the filter information is information indicating filter OFF (YES in Step S1101), the boundary filtering unit 105 determines that none of pixels adjacent to the target boundary are filtering process target pixels (Step S1102).

Meanwhile, when the filter information is information indicating filter ON (NO in Step S1101), the boundary filtering unit 105 determines that the pixel p0 and the pixel q0 are filtering process target pixels (Step S1103). Next, the boundary filtering unit 105 compares an absolute value of the difference in pixel value between the pixel p1 and the pixel p0 with a predetermined threshold TH (Step S1104). Here, the threshold TH is a value given by Expression 1, for example.

[Math. 1]

$$TH = 0.8 \cdot (2^{(QP+Offset)/6} + 1) \quad \text{(Expression 1)}$$

Here, QP is a quantization parameter which denotes quantization precision. Moreover, Offset is described in the file header information as an adjustment parameter.

It should be noted that it may be determined such that when the quantization parameter QP is greater, the threshold TH is greater. It is not necessary to be determined according to Expression 1. Moreover, the threshold TH may be described in the file header information.

Here, the absolute value of the difference is smaller than the threshold TH (YES in Step S1104), the boundary filtering unit 105 further determines that the pixel p1 is a filtering process target pixel (Step S1105). Meanwhile, the absolute value of the difference is greater than or equal to the threshold TH (NO in Step S1104), the processing moves on to the next step S1106.

Next, the boundary filtering unit 105, as similarly to Step S1104, compares an absolute value of the difference in pixel value between the pixel p1 and the pixel q0 with a predetermined threshold TH (Step S1106). It should be noted that the threshold TH is used with the same value in Step S1104.

Here, the absolute value of the difference is smaller than the threshold TH (YES in Step S1106), the boundary filtering unit 105 further determines that the pixel q1 is a filtering process target pixel (Step S1107) and then the determination process for the filtering process target pixel is ended. Meanwhile, the absolute value of the difference is greater than or equal to the threshold TH (NO in Step S1106), the determination process for the filtering process target pixel is ended.

It should be noted that the threshold TH is a value which varies depending on the quantization parameter QP indicated in Expression 1 as an example. However, the threshold TH may be a value which varies depending on a difference in motion vector between prediction units adjacent to the target boundary. For example, it may be determined such that when a sum MVD of (i) the absolute value of the difference of the x component of the motion vector and (ii) the absolute value of the difference of the y-component of the motion vector is greater, the threshold TH is greater.

When the motion vector difference is greater, variations in image characteristics in the target boundary are probably different. Therefore, by varying the threshold TH depending on the motion vector difference, the filtering process target pixel adapted to the image characteristics can be determined.

Moreover, the threshold TH may be determined such that it varies depending on the MVD and the quantization parameter QP.

With the above described method, the filtering process target pixel is determined.

It should be noted that the boundary filtering unit 105 determines whether or not only the pixels p0, p1, q0, and q1 are filtering process target pixels. Furthermore, the boundary filtering unit 105 may make a determination on the pixel p2 and the pixel q2. In that case, the boundary filtering unit 105 may determine that the pixel p2 and the pixel q2 are filtering process target pixels, by comparing the absolute value of the difference (for example, |p2−p1|) with the threshold on the assumption that the adjacent pixel is the filtering process target pixel (for example, p1).

It should be noted that in Step S1101, the case where the filter information indicating ON/Off of the filter is described in the stream header information. However, the filter information does not necessarily have to be described in the header information. For example, if ON/OFF of the filter is determined in the coding method and the decoding method, the filter information does not have to be described in the header information. In this case, the amount of the header information can be reduced.

Moreover, for example, the filter information indicating the number of boundary pixels may be described in the header information. In this case, in Step S1101 of FIG. 11, the boundary filtering unit 105 may determine the filtering process target pixel according to the number of pixels indicated by the filter information. For example, when the number of pixels is one, the boundary filtering unit 105 may determine that the pixels p0 and q0 are filtering process target pixels. Moreover, for example, when the number of pixels is two, the boundary filtering unit 105 may determine that the pixels p1, p0, q0, and q1 are filtering process target pixels. With this, the amount of processing by the boundary filtering unit 105 can be significantly reduced.

It should be noted that how to transmit the header information will be described in detail in other embodiments.

Embodiment 4

In Embodiment 4 of the present invention, filtering process on the target boundary in Embodiments 1 and 2 will be described. More specifically, the filtering process on the filtering process target pixels determined in Embodiment 3 will be described in detail.

Here, it is assumed that the filtering process target pixels are already determined by the method shown in Embodiment 3. Moreover, the filtering process will be described with reference to pixel indexes p3, p2, p1, p0, q0, q1, q2, and q3 arranged in a line in the filtering process direction shown in FIG. 8. It should be noted the pixel values of the pixel p3, the pixel p2, the pixel p1, the pixel p0, the pixel q0, the pixel q1, the pixel q2, and the pixel q3 are p3, p2, p1, p0, q0, q1, q2, and q3, respectively. Moreover, the following will describe the case where the image coding apparatus 100 according to Embodiment 1 performs the filtering process.

Figure 12:
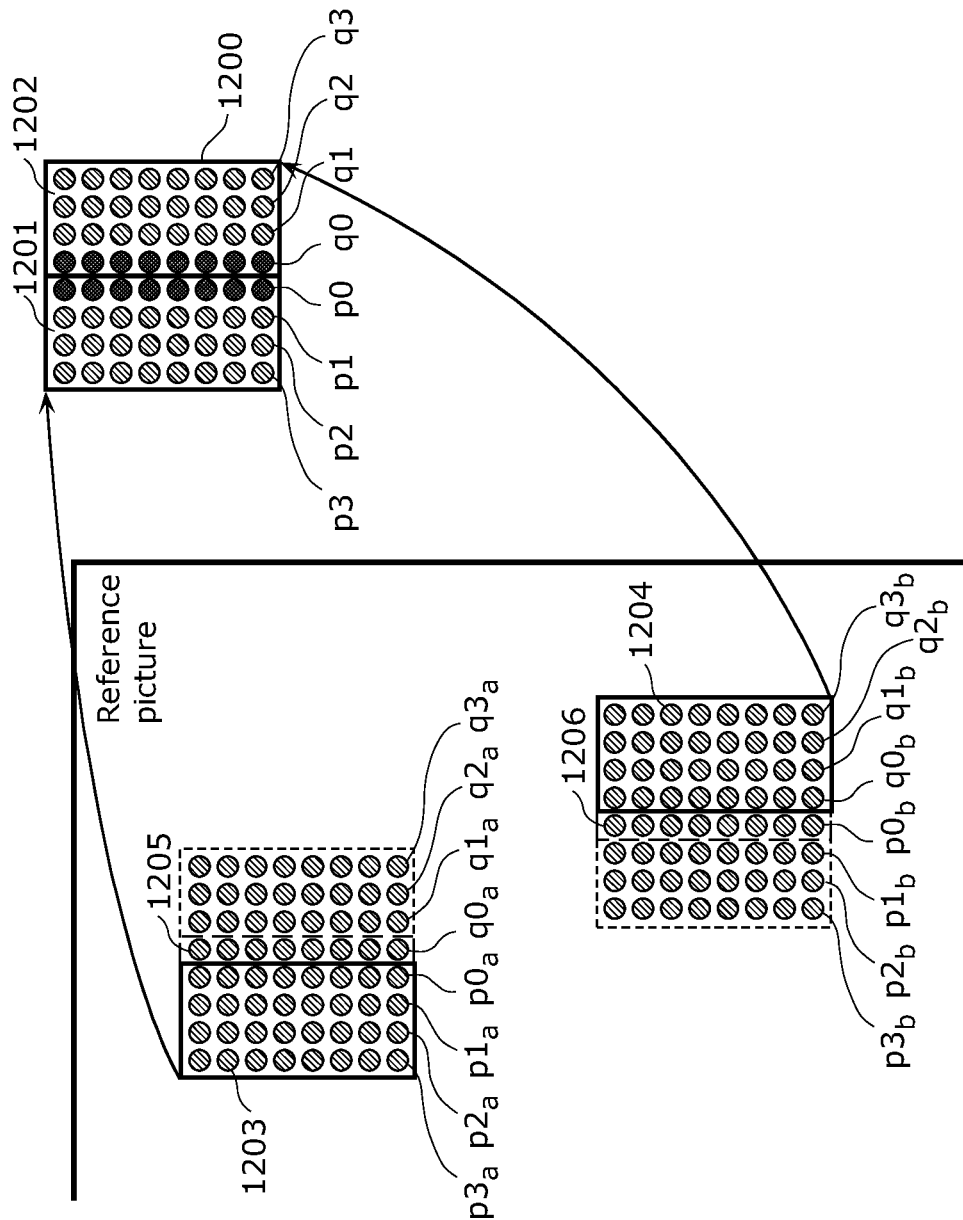
FIG. 12 is a schematic view for explaining an example of filtering process according to Embodiment 4 of the present invention.

FIG. 12 is a schematic view for explaining an example of filtering process according to Embodiment 4 of the present invention. In FIG. 12, a target block 1200 is partitioned into a partitioned area 1201 and a partitioned area 1202 each of which is a unit of horizontal 4 pixels and vertical 8 pixels. The target block 1200 is a transform unit, and the partitioned area 1201 and the partitioned area 1202 are each a prediction unit.

In this case, the coding control unit 104 obtains a reference image 1203 and a reference image 1204 from the reference picture memory 103. The coding control unit 104 merges the reference image 1203 and the reference image 1204 to generate a prediction image of the target block (motion compensated image).

For example, when the filtering process target pixels are the pixels p0 and q0 in all lines, the boundary filtering unit 105 performs filtering process with the use of a reference image area 1205 adjacent to the reference image 1203 and a reference image area 1206 adjacent to the reference image 1204. For example, the boundary filtering unit 105 determines that an average value obtained by the calculation of overlapped areas (cross-hatched parts in the target block 1200) by pixel units is a filtered pixel value.

It should be noted that here, the boundary filtering unit 105 calculates an average value of the two reference images to determine the pixel value of the pixel adjacent to the target boundary. The boundary filtering unit 105, however, may perform filtering process as shown in Expression 2.

[Math. 2]

$$p0 = p0_a \cdot d_0 + p0_b \cdot (1-d_0)$$

$$q0 = q0_b \cdot d_0 + q0_a \cdot (1-d_0)$$

$$p1 = p1_a \cdot d_1 + p1_b \cdot (1-d_1)$$

$$q1 = q1_b \cdot d_1 + q1_a \cdot (1-d_1)$$

$$p2 = p2_a \cdot d_2 + p2_b \cdot (1-d_2)$$

$$q2 = q2_b \cdot d_2 + q2_a \cdot (1-d_2) \quad \text{(Expression 2)}$$

Here, d0, d1, and d2 are filter coefficients each of which is determined by each of the distances from the target boundary, and they range from 0.5 to 1. For example, d0 is equal to 0.5, d1 is equal to 0.75, and d2 is equal to 0.875. These values may be determined in advance as the values common to the image coding method or the image decoding method, and may be described in the stream header information.

When filter strength is increased (smoothness is enhanced), the filter coefficients d0, d1, and d2 may be each set to a value near 0.5.

It should be noted that the boundary filtering unit 105 may perform filtering process by up-shift or downshift according to Expression 3 obtained by the transform of Expression 2. For example, d0=0.5, d1=0.75, and d2=0.875 in Expression 2 can be represented as A=1, B=1, C=1, D=3, E=2, F=1, G=7, H=3, and I=1 in Expression 3. In this way, when the filtering process is performed according to Expression 3, the amount of information of the header information can be reduced and the processing amount of the filtering process can be reduced.

[Math. 3]

$$p0 = (p0_a \cdot A) \gg C + (p0_b \cdot B) \gg C$$

$$q0 = (q0_b \cdot A) \gg C + (q0_a \cdot B) \gg C$$

$$p1 = (p1_a \cdot D) \gg E + (p1_b \cdot F) \gg E$$

$$q1 = (q1_b \cdot D) \gg E + (q1_a \cdot F) \gg E$$

$$p2 = (p2_a \cdot G) \gg H + (p2_b \cdot I) \gg H$$

$$q2 = (q2_b \cdot G) \gg H + (q2_a \cdot I) \gg H \quad \text{(Expression 3)}$$

By the method shown above, the boundary filtering unit 105 can perform filtering process on the determined filter target pixels. It should be noted that the boundary filtering unit 105 can reduce memory access by obtaining an image of an area larger than the partitioned area (prediction unit) when obtaining the reference image from the reference picture memory 103.

It should be noted that the boundary filtering unit 105 may perform filtering process in a method other than the above described method. The boundary filtering unit 105 may perform filtering process according to Expression 4, for example. Here, the filtered pixel values of the pixel q1, the pixel q0, the pixel p0, and the pixel p1 are expressed as q'1, q'0, p'0, and p'1, respectively.

[Math. 4]

$$p'0 = c_{0,0} \cdot p1 + c_{0,1} \cdot p0 + c_{0,2} \cdot q0 + c_{0,3} \cdot q1$$

$$p'1 = c_{1,0} \cdot p2 + c_{1,1} \cdot p1 + c_{1,2} \cdot p0 + c_{1,3} \cdot q0$$

$$q'0 = c_{0,0} \cdot q1 + c_{0,1} \cdot q0 + c_{0,2} \cdot p0 + c_{0,3} \cdot p1$$

$$q'1 = c_{1,0} \cdot q2 + c_{1,1} \cdot q1 + c_{1,2} \cdot q0 + c_{1,3} \cdot q1 \quad \text{(Expression 4)}$$

Here, $c_{0,0}$ $c_{0,1}$ $c_{0,2}$ $c_{0,3}$ $c_{1,0}$ $c_{1,1}$ $c_{1,2}$ and $c_{1,3}$ are filter coefficients, and for example, can be expressed by Expression 5.

[Math. 5]

$$\{c_{0,0}, c_{0,1}, c_{0,2}, c_{0,3}\} = \left\{\frac{1}{8}, \frac{1}{2}, \frac{1}{2}, -\frac{1}{8}\right\}$$
$$\{c_{1,0}, c_{1,1}, c_{1,2}, c_{1,3}\} = \left\{\frac{7}{16}, \frac{3}{16}, \frac{5}{16}, \frac{1}{16}\right\} \quad \text{(Expression 5)}$$

The filtering process implemented by the filter coefficients in Expression 5 smoothes variations in pixel value in the target boundary, as shown in a shift from the image in (b) of FIG. 8 to the image in (c) of FIG. 8. It should be noted that the filter coefficients are not limited to Expression 5. For example, rounded values may be set as shown in Expression 6.

[Math. 6]

$$\{c_{0,0}, c_{0,1}, c_{0,2}, c_{0,3}\} = \left\{\frac{1}{4}, \frac{1}{4}, \frac{1}{4}, \frac{1}{4}\right\}$$
$$\{c_{1,0}, c_{1,1}, c_{1,2}, c_{1,3}\} = \left\{\frac{1}{4}, \frac{1}{4}, \frac{1}{4}, \frac{1}{4}\right\} \quad \text{(Expression 6)}$$

In this case, the filtering process is strong (for enhancing smoothness). When the filtering process is performed in this way, an obtaining amount of pixel data for motion compensation can be reduced and the processing amount can be reduced.

It should be noted that here, the case where a pixel whose distance from the target boundary is up to two pixels is the filter target pixel is described. Filtering process similar to the above described process can be performed even when a pixel whose distance from the target pixel is up to 3 pixels is the filtering process target pixel, by increasing the number of filter coefficients.

It should be noted that one of kinds of filters, filter coefficients, a code indicating filter strength may be described in the header information. With this, a steep edge which does not exist in a natural image within the transform unit can be removed. As a result, since the prediction image can be closer to the input image, the difference image can be efficiently transformed by the transform, and the code amount can be reduced.

It should be noted that the case is described where the target boundary is a horizontal direction and a vertical direction. Process can be performed similarly to the above described process also when the target boundary is a diagonal direction.

It should be noted that how to transmit filter header information will be described in detail in other embodiments.

Embodiment 5

Next, Embodiment 5 of the present invention will be described. In the present embodiment, the image coding apparatus determines the optimal filtering process method among a plurality of filtering process methods and describes the filter information indicating the determined filtering process method in a coded image signal.

Figure 13:
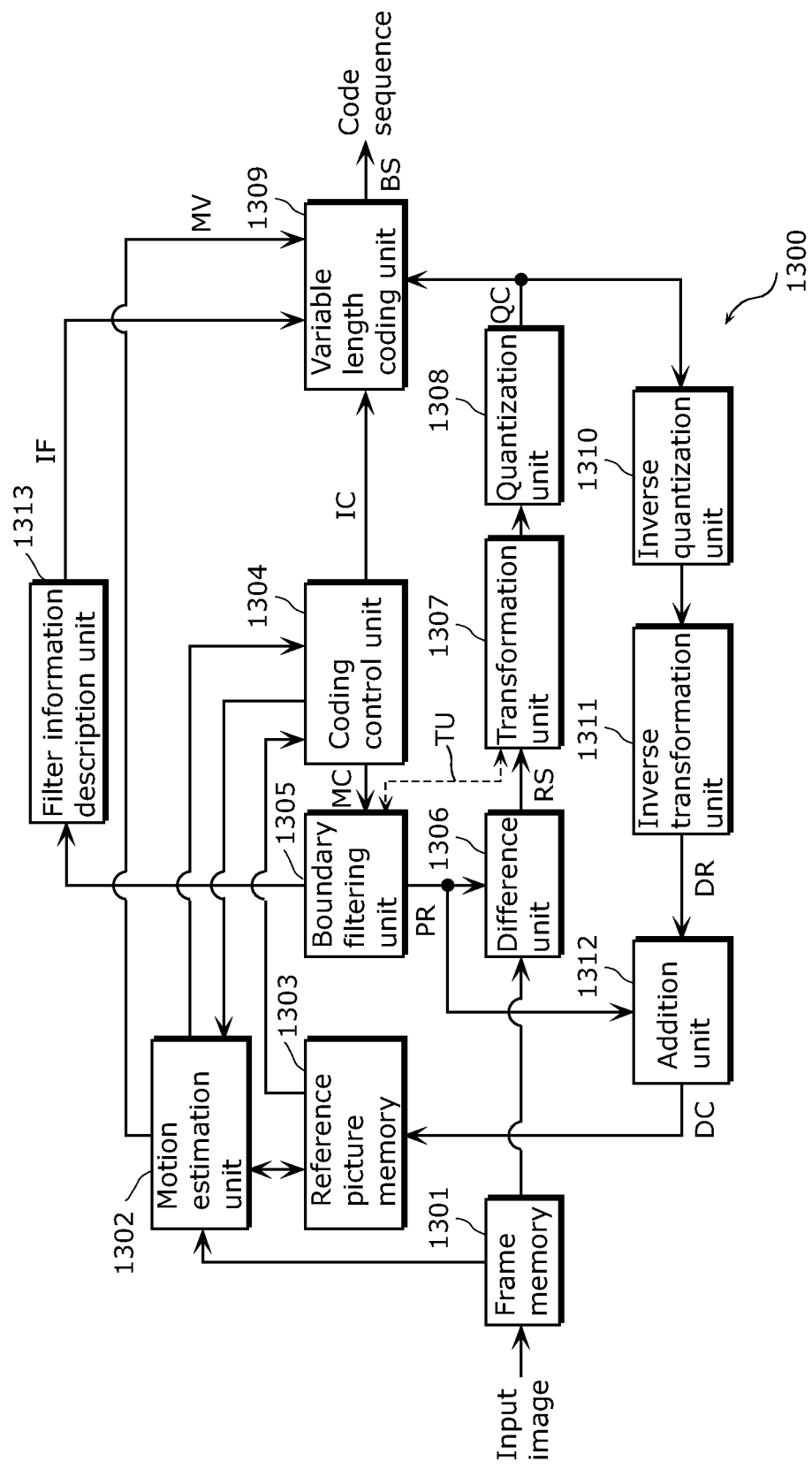
FIG. 13 is a block diagram showing a functional configuration of an image coding apparatus according to Embodiment 5 of the present invention.

FIG. 13 is a block diagram showing a functional configuration of an image coding apparatus according to Embodiment 5 of the present invention. As shown in FIG. 13, an image coding apparatus 1300 includes a frame memory 1301, a motion estimation unit 1302, a reference picture memory 1303, a coding control unit 1304, a boundary filtering unit 1305, a difference unit 1306, a transformation unit 1307, a quantization unit 1308, a variable length coding unit 1309, an inverse quantization unit 1310, an inverse transformation unit 1311, an addition unit 1312, and a filter information description unit 1313. The image coding apparatus 1300 also includes the filter information description unit 1313 on top of the constituent elements included in the image coding apparatus 100 in FIG. 1.

It should be noted that among the processing blocks in common with those of the image coding apparatus 100, a description will be omitted for the processing blocks excluding those of the boundary filtering unit 1305 and the variable length coding unit 1309 because they operate similarly to those in Embodiment 1.

Figure 14:
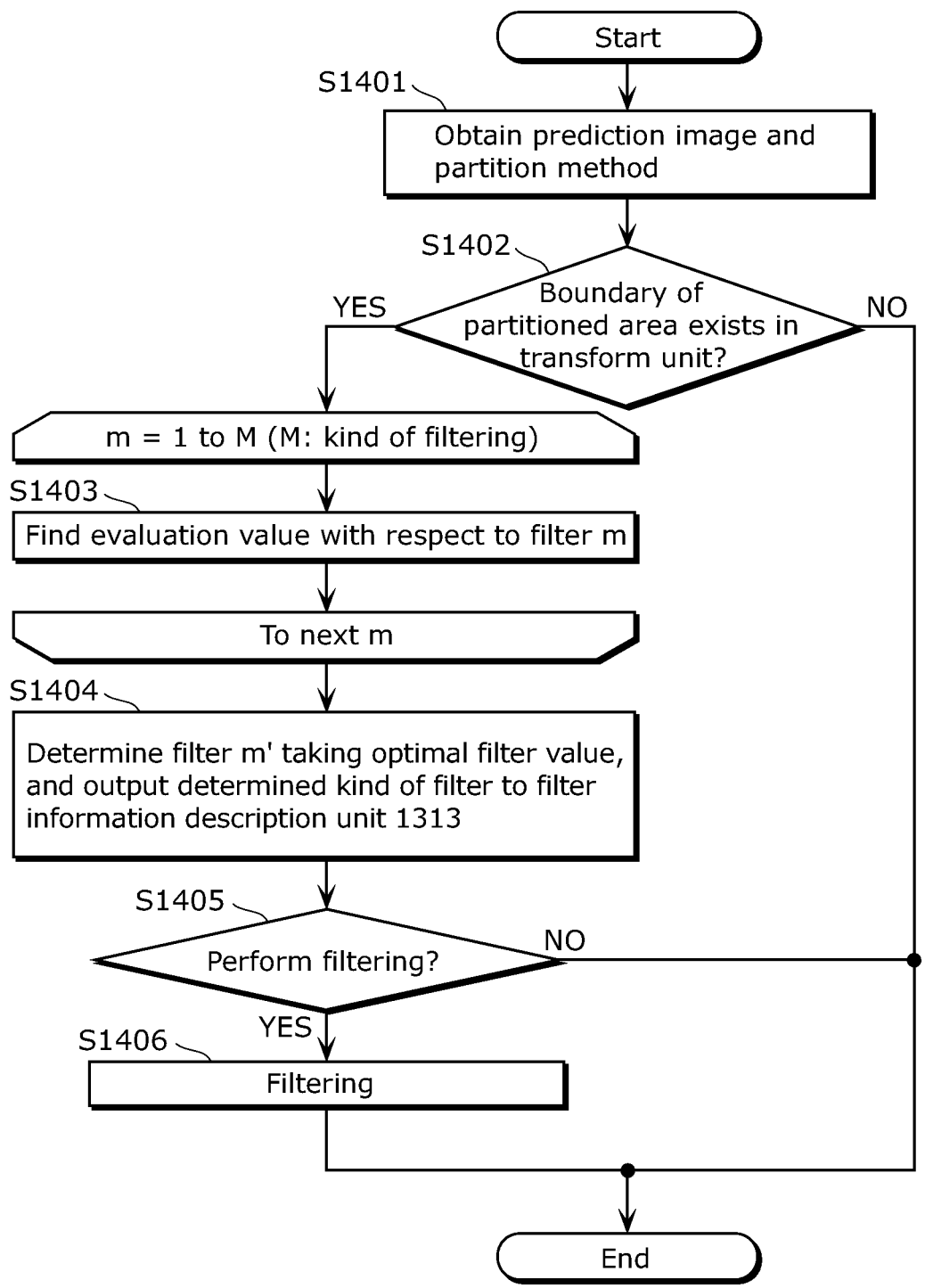
FIG. 14 is a flowchart showing an operation of a boundary filtering unit according to Embodiment 5 of the present invention.

The operation of the boundary filtering unit 1305 will be described with reference to FIG. 14. FIG. 14 is a flowchart for describing the operation in which the boundary filtering unit 1305 performs filtering process on the prediction image MC based on the partition method.

The boundary filtering unit 1305 obtains, from the coding control unit 1304, a prediction image MC and the partition method corresponding to the prediction image MC (Step S1401).

Next, the boundary filtering unit 1305 determines whether or not the boundary of the partitioned area exists within the transform unit (Step S1402). In other words, the boundary filtering unit 1305 compares the transform unit with the partitioned area to detect the boundary of the partitioned area which is located within the transform unit.

More specifically, the boundary filtering unit 1305 obtains information about the shape of the partitioned area based on the partition method corresponding to the prediction image MC. The boundary filtering unit 1305, for example, as shown in FIG. 5, compares, with the partitioned area, the transform unit which is determined in advance according to the partition method, and determines whether or not the boundary of the partitioned area (target boundary) exists within the transform unit. Since the process of Step S1402 is similar to the process of Step S402 in Embodiment 1, a detailed description will be omitted.

Here, when the target boundary is not detected (NO in Step S1402), filtering process is not performed on the prediction image of the target block and the boundary filtering process is ended.

Meanwhile, when the target boundary is detected (YES in Step S1402), the boundary filtering unit 1305 calculates an evaluation value for each of the filtering process methods for the target boundary (for example, the target boundary shown in (c) of FIG. 6) (Step S1403). Here, the boundary filtering unit 1305 finds an evaluation value for each of the filtering process methods described in Embodiment 4. There are four kinds of filtering process methods, for example, that is, no filter, the filtering process by Expression 2 (coefficients (0.5, 0.7, and 0.825)), the filtering process by Expression 2 (coefficients (0.5, 0.5, and 0.5)), and the filtering process by Expression 5. A combination of the methods is one example. For example, a combination of more methods is acceptable.

As an evaluation value, a weighted sum of (i) a sum of absolute values of the difference between the filtered prediction image and the input image and (ii) the code amount of the filtering process method and the filter coefficients can be used. In this case, when the evaluation value is smaller, the evaluation is higher.

Moreover, the evaluation value may be a sum of values obtained after the transform process on the transform unit (for example, transform for use in coding or Hadamard transform). With this, the effect of filter can be appropriately evaluated.

The boundary filtering unit 1305, among a plurality of filtering process methods, determines the filtering process method (method and coefficient) having a value of the highest evaluation (here, the smallest evaluation value). The boundary filtering unit 1305 outputs the filter information indicating the determined filtering process method to the filter information description unit 1313 (Step S1404).

When the determined filtering process method shows a result that no filtering process is performed (NO in Step S1405), the boundary filtering unit 1305 directly outputs, without performing the filtering process, the motion compensated image (prediction image PR) to the addition unit 1312 and the difference 1306. Meanwhile, when the filtering process is performed (YES in Step S1405), the boundary filtering unit 1305 performs filtering process on the target boundary based on the method determined by Step S1404 (Step S1406), and then outputs the filtered prediction image PR to the addition unit 1312 and the difference unit 1306.

The filter information description unit 1313 outputs the filter information obtained from the boundary filtering unit 1305 as the filter header information to the variable length coding unit 1309. It should be noted that the operation of the filter information description unit 1313 and how to describe the filter header information will be described in detail in other embodiments.

By the image coding method according to the above described present embodiment, it is possible to determine the filtering process method having high filtering process effect among a plurality of the filtering process methods. According to the filtering process method that is determined in such a way, the filtering process can be performed on a part of the boundary of the prediction unit within the transform unit. As a result, since the difference between the input image and the prediction image can be smaller, the code amount can be reduced.

It should be noted that the boundary filtering unit 1305 calculates an evaluation value for each of all combinations of filtering process methods. However, when the evaluation value is less than the predetermined threshold, the boundary filtering unit 1305 may cancel calculation of the subsequent evaluation values, and may determine that the filtering process method at that time is the optimal filtering process method. With this, the processing amount for determining the filtering process method can be reduced.

Furthermore, as shown in FIG. 13, by a transfer of the transfer unit TU between the boundary filtering unit 1305 and the transformation unit 1307, a change within the transform unit after considering the presence or absence of the boundary filtering process can be implemented.

Figures 15, 16:
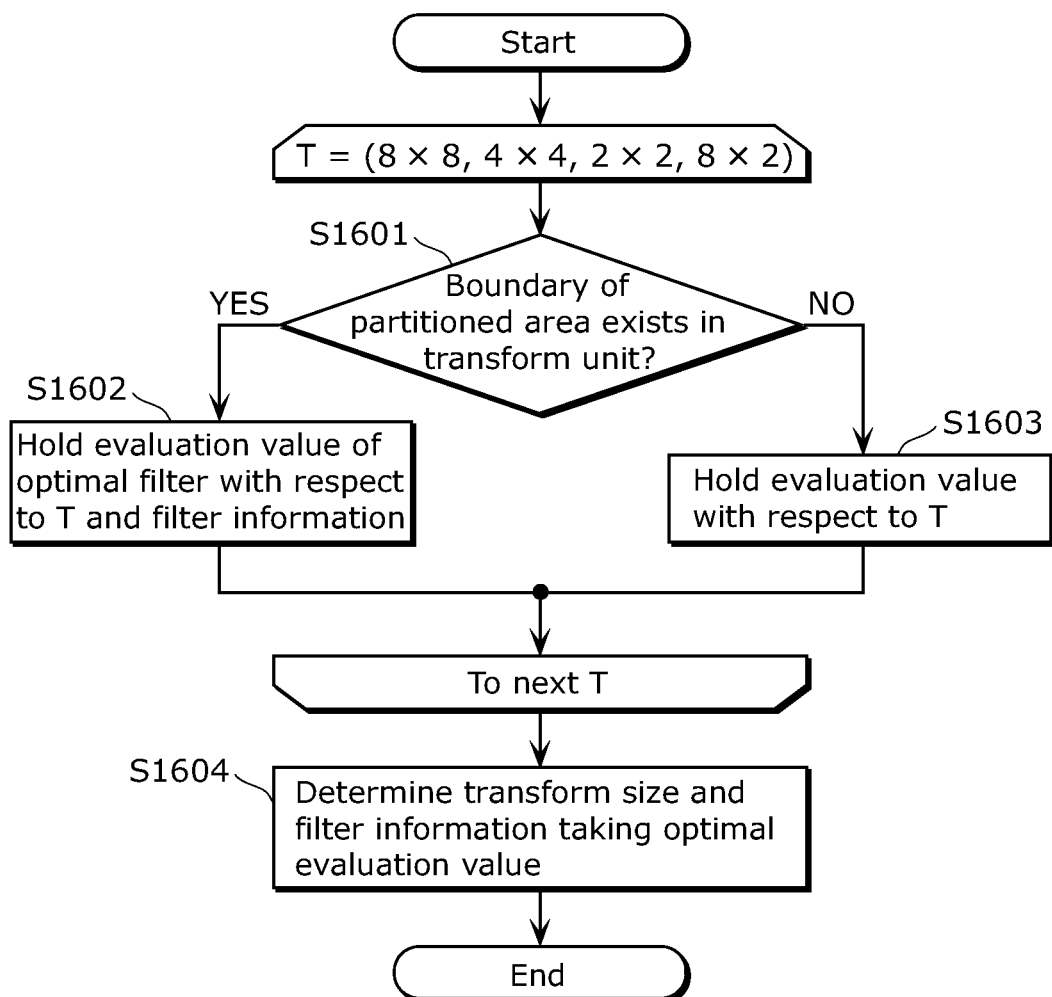
FIG. 15 is a schematic view showing an example of a transform size candidate for a transform unit with respect to a partition method.
FIG. 16 is a flowchart showing a flow of processing performed by a method for determining a transform size.

FIG. 15 is a diagram showing an example of a transform size candidate for a transform unit with respect to a partition method. FIG. 16 is a flowchart showing a flow of processing performed by a method for determining the transform size.

First, the boundary filtering unit 1305 sequentially determines, with respect to the transform sizes shown in FIG. 15, whether or not the part of the boundary of the partitioned area (prediction unit) indicated by the partition method exists within the transform unit (Step S1601). For example, in the case of a transform size 8×8, three boundaries in a horizontal direction are detected as the target boundaries and it is determined that the boundary of the partitioned area exists within the transform unit.

Here, when the boundary of the partitioned area exists within the transform unit (YES in Step S1601), the boundary filtering unit 1305 determines, by the method shown in FIG. 14, the filtering process method having an optimal evaluation value and holds the filtering process method and the evaluation value (Step S1602). Here, for example, when there are three boundaries of the partitioned area within the transform unit, the boundary filtering unit 1305 may determine the filtering process method based on a sum of evaluation values for the three boundaries.

Meanwhile, when there is no boundary of the partition area within the transform unit (NO in Step S1601), the boundary filtering unit 1305 calculates an evaluation value and holds the evaluation value (Step S1603). For example, in the case of a transform size 2×2, since there is no boundary of the partitioned area within the transform unit, an evaluation value for the transform size 2×2 is calculated. Also in this case, a method similar to the above described method (a weighted sum of (i) a sum of absolute differences or a sum of values obtained through transform for a difference value by the transform unit (ii) the code amount of the transform size information and the filter information) can be used.

Once the evaluation values for all transform sizes are calculated, the boundary filtering unit 1305 determines, based on the evaluation values, the transform size of the transform unit and the filtering process method. The determined transform size is output to the filter information description unit 1313 along with the filter information and is described as the stream header information in a code sequence.

As described above, the partition method, the transform size, and the filtering process method can be determined such that the difference between the input image and the filtered prediction image is smaller.

It should be noted that the boundary filtering unit 1305 calculates an evaluation value for each of all combinations of transform sizes. However, when the evaluation value is less than the predetermined threshold, the boundary filtering unit 1305 may cancel calculation of the subsequent evaluation values, and may determine that the filtering process method at that time is the optimal filtering process method. With this, the processing amount can be reduced.

Embodiment 6

Figure 17:
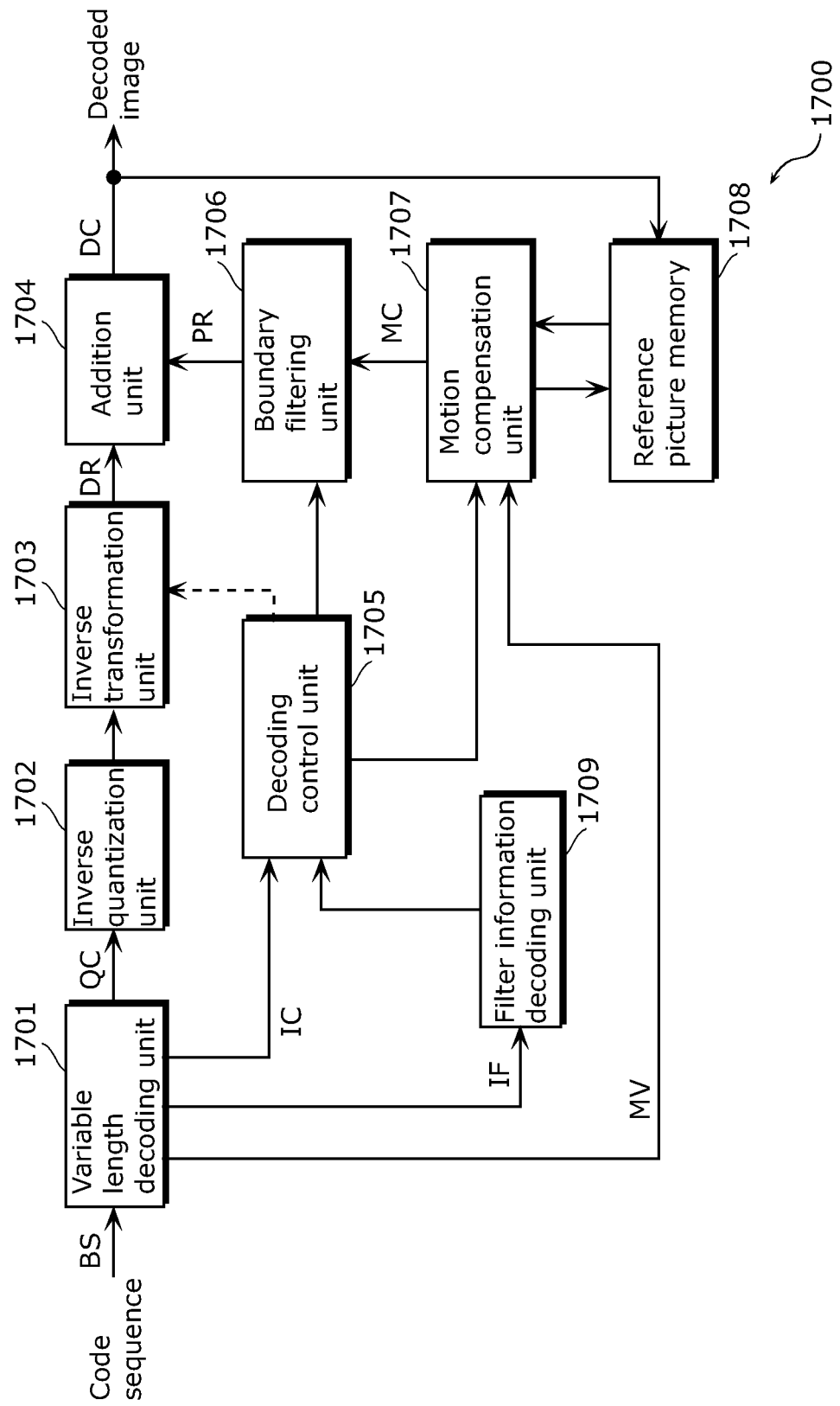
FIG. 17 is a block diagram showing a functional configuration of an image decoding apparatus according to Embodiment 6 of the present invention.

FIG. 17 is a block diagram showing a functional configuration of an image decoding apparatus according to Embodiment 6 of the present invention. The image decoding apparatus 1700 decodes a code sequence generated by the image coding apparatus 1300 according to Embodiment 5 of the present invention.

The image decoding apparatus 1700 includes a variable length decoding unit 1701, an inverse quantization unit 1702, an inverse transformation unit 1703, an addition unit 1704, a decoding control unit 1705, a boundary filtering unit 1706, a motion compensation unit 1707, a reference picture memory 1708, and a filter information decoding unit 1709. Here, the image decoding apparatus 1700 according to the present embodiment is a configuration obtained by adding the filter information decoding unit 1709 to the image decoding apparatus 900 according to Embodiment 2 of the present invention. The image decoding apparatus 1700 performs an operation similar to the image decoding apparatus 900, except the operations of the decoding control unit 1705 and the boundary filtering unit 1706.

Figure 18:
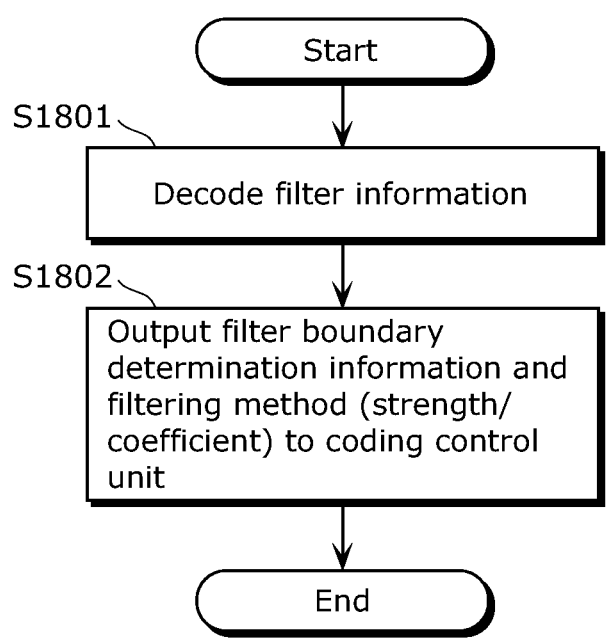
FIG. 18 is a flowchart showing a flow of filter information decoding processes according to Embodiment 6 of the present invention.

FIG. 18 is a flowchart showing a flow of filter information decoding processing according to Embodiment 6 of the present invention. The filter information decoding unit 1709 obtains a code sequence of filter information from the variable length decoding unit 1701, to decode the code sequence (Step S1801). The filter information decoding unit 1709 outputs, to the decoding control unit 1705, the filter boundary determination information (an offset value, the threshold, or the number of boundary pixels for deriving a threshold for determining the filter boundary), the filtering process method, filter strength, or filter coefficients that are obtained from decoding (Step S1802). It should be noted that the decoding control unit 1705 changes a method for obtaining an image from the motion compensation unit when the obtained information for determining the filter boundary is output to the boundary filtering unit 1706 and the filtering process method is expressed by Expression 2. With the above described operation, the code sequence generated by the image decoding method according to Embodiment 5 can be accurately decoded.

Figure 19:
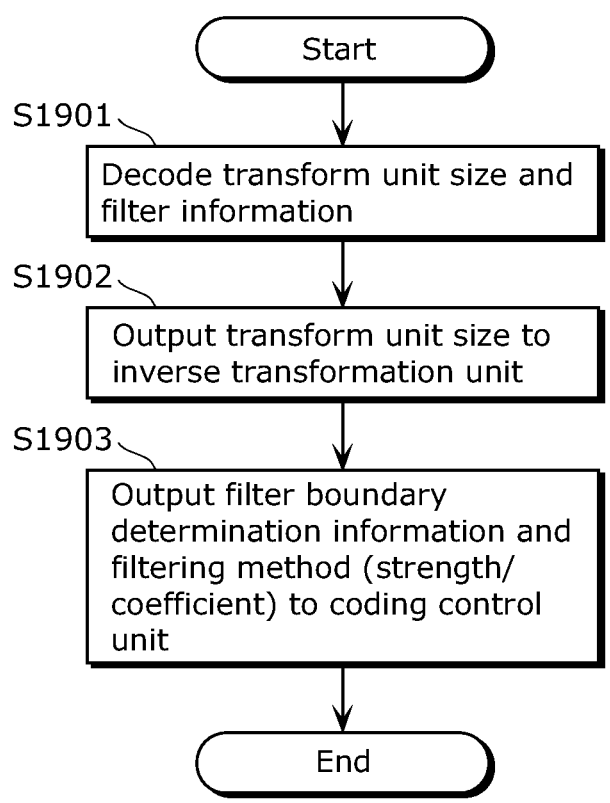
FIG. 19 is a flowchart showing a flow of decoding processing when information of a transform unit is included in filter information.

Furthermore, a flow of operations in which the image coding method describes the transform unit size in the code sequence will be shown in FIG. 19.

The filter information decoding unit 1709 obtains the filter information and a code sequence of the transform size from the variable length decoding unit 1701 to decode the transform unit size and the filter information (Step S1901). The filter information decoding unit 1709 outputs the transform unit size obtained by decoding to the decoding control unit 1705. The decoding control unit 1705 outputs the transform unit size to the inverse transformation unit 1703 (Step S1902). Moreover, the filter information decoding unit 1709 outputs, to the decoding control unit 1705, the filter boundary determination information and the filtering process method (coefficient or strength) that are obtained by decoding (S1903).

With this operation, even when the transform processing unit is described in the code sequence, the decoding method according to the present invention makes it possible to accurately decode the code sequence.

Embodiment 7

In Embodiment 7 of the present invention, a method for describing the film header information FltStr indicating the information for determining the filter, the transform unit size for the filtering process, and the like, as the stream header information and for coding and decoding the film header information will be described.

Figure 20:
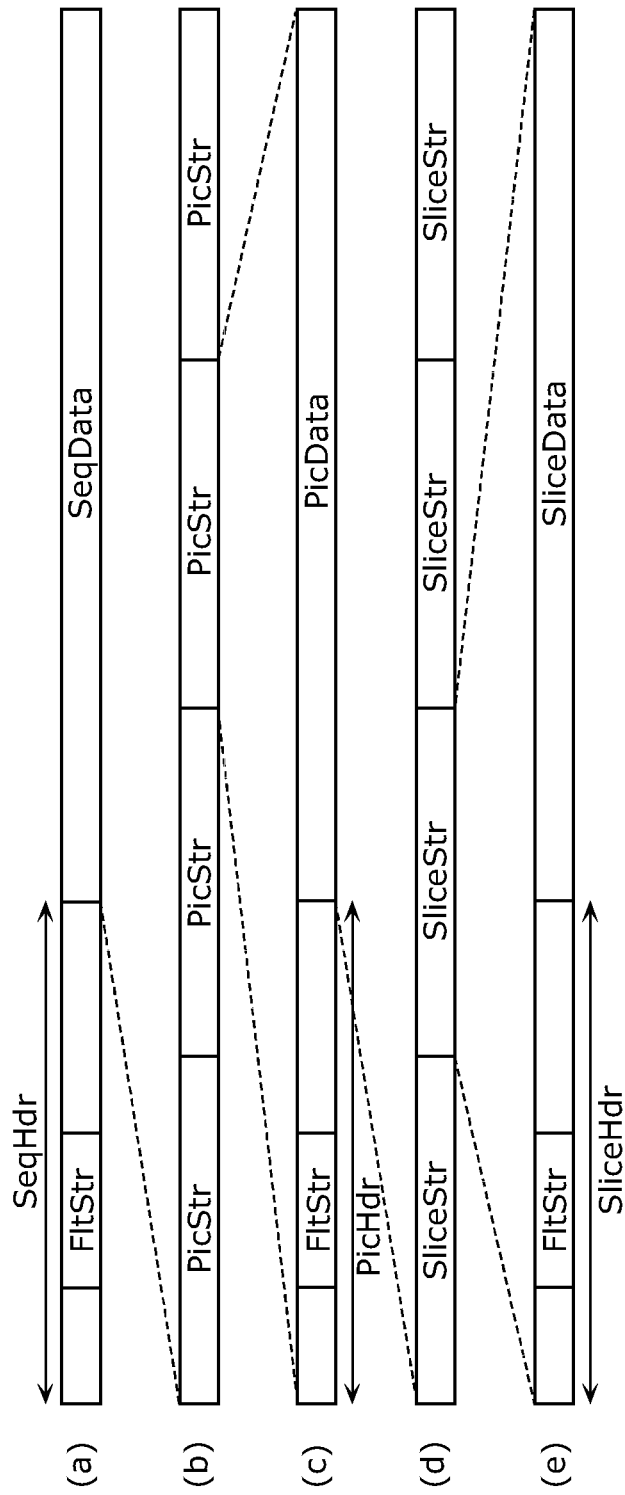
FIG. 20 is a block diagram of a code sequence in the image coding method according to Embodiment 7 of the present invention.

FIG. 20 is a block diagram of a code sequence BS in the image coding method according to Embodiment 7 of the present invention. FIG. 20 shows, in (a), a coded signal corresponding to a moving picture sequence including at least a screen. The coded signal is composed of sequence data SeqData that is data for all screens and sequence header SeqHdr that is data common to all data for all screens.

The filter header information FltStr is information which includes the information for determining the filter, the transform unit size for filtering process, and the like. For example, the filter header information FltStr includes information for performing ON/OFF of filter on the target boundary within the transform unit (for example, NO_TU_MC_FLT_FLG=0 (OFF) and NO_TU_MC_FLT_FLG=1 (ON)). Moreover, when the filter is ON, the filter header information FltStr can include, as the information for determining the filter, an OFFSET value for use in calculating a threshold for determining the filter, a threshold TH, or the number of adjacent pixels from the target boundary. Furthermore, the filter header information FltStr can include, as the information for filtering process, the filtering process method, filter coefficients, or the number of filter strength. Moreover, all of these do not have to be included in, and a predetermined value by the image coding method and the image decoding method may be used for part of the information. Moreover, by switching between a table 2101 and a table 2102 with the transform unit size shown in FIG. 21, a code number which represents the combination of these pieces of information may be transmitted. It should be noted that an overlap type of the filtering process method is processed by a formula given by Expression 2 and a filter tap type is processed by a formula given by Expression 4. Moreover, in an example of FIG. 21, the transform unit size is used for switching between the tables. However, the switching is not limited to such.

The sequence header includes the filter header information FltStr.

In (b) of FIG. 20, the structure of the sequence data SeqData is shown. The sequence data SeqData includes a picture signal PicStr that is a coded signal of a picture corresponding to a screen.

In (c) of FIG. 20, the structure of the picture signal PicStr is shown. The picture signal PicStr is composed of the picture data PicData that is data for a screen and the picture header PicHdr that is common to the whole of the screen. The picture header PicHdr includes the filter header information FltStr.

In (d) of FIG. 20, the structure of the picture data PicData is shown. The picture data PicData includes a slice signal SliceStr which is a coded signal of a slice composed of a group of block units.

In (e) of FIG. 20, the structure of the slice signal SliceStr is shown. The slice signal SliceStr is composed of a slice data SliceData that is data for a slice and a slice header SliceHdr that is data common to all data for a slice. By including the filter header information FltStr in the slice header SliceHdr, a coded signal which has received on a slice data SliceData basis can be accurately decoded.

It should be noted that when a plurality of picture signals PicStr are included in the sequence data SeqData, the filter header information FltStr may be included only in some of the picture headers PicHdr rather than being included in all the picture headers PicHdr. Similarly, when a plurality of slice signals SliceStr are included in the picture data PicData, the filter header information FltStr may be included in some of the slice headers SliceHdr rather than being included in all the slice headers SliceHdr. If the content of the filter header information is common to each of the slices and there is no filter header information in the slice header as shown in (e) of FIG. 20, it is possible to restrict an increase in the number of bits by repeating the filter header information FltStr by using, as a substitute, the filter header information of another slice header.

Moreover, when the code sequence BS is transmitted not by a bit stream that is consecutive but by a packet that is a unit of segmented data, the header part and the data part that is a part other than the header part may be separated and then transmitted separately. In that case, as shown in FIG. 20, it is impossible to be a bit stream that combines the header part and the data part. However, in the case of packet, if an order for transmitting the header part and the data part is not consecutive, the header part corresponding to the data part is transmitted by a packet that is different from the data part. Even if they are not formed into a bit stream, the concept is the same as the bit stream described in FIG. 20.

Moreover, in the decoding method according to the present embodiment, the code sequence BS that is coded by the above described method is decoded according to the following procedures. First, the filter data information FltStr included in the sequence header SeqHdr is obtained and each of the pieces of information is held. Next, the filter header information FltStr included in the picture header PicHdr is obtained and each of the pieces of information is updated. Here, when the filter header information FltStr does not exist or part of the filter header information FltStr does not exist, the information included in the sequence header SeqHdr is held without any change. Similarly, the filter header information FltStr included in the slice header SliceHdr is obtained and each of the pieces of information is updated.

With this, the code sequence can be accurately decoded.

Embodiment 8

In Embodiment 8 of the present invention, in the intra prediction image, when the boundary of the prediction image exists within the transform unit, an image coding method for performing filtering process on the boundary as similarly to the motion compensated image will be described.

Figure 22:
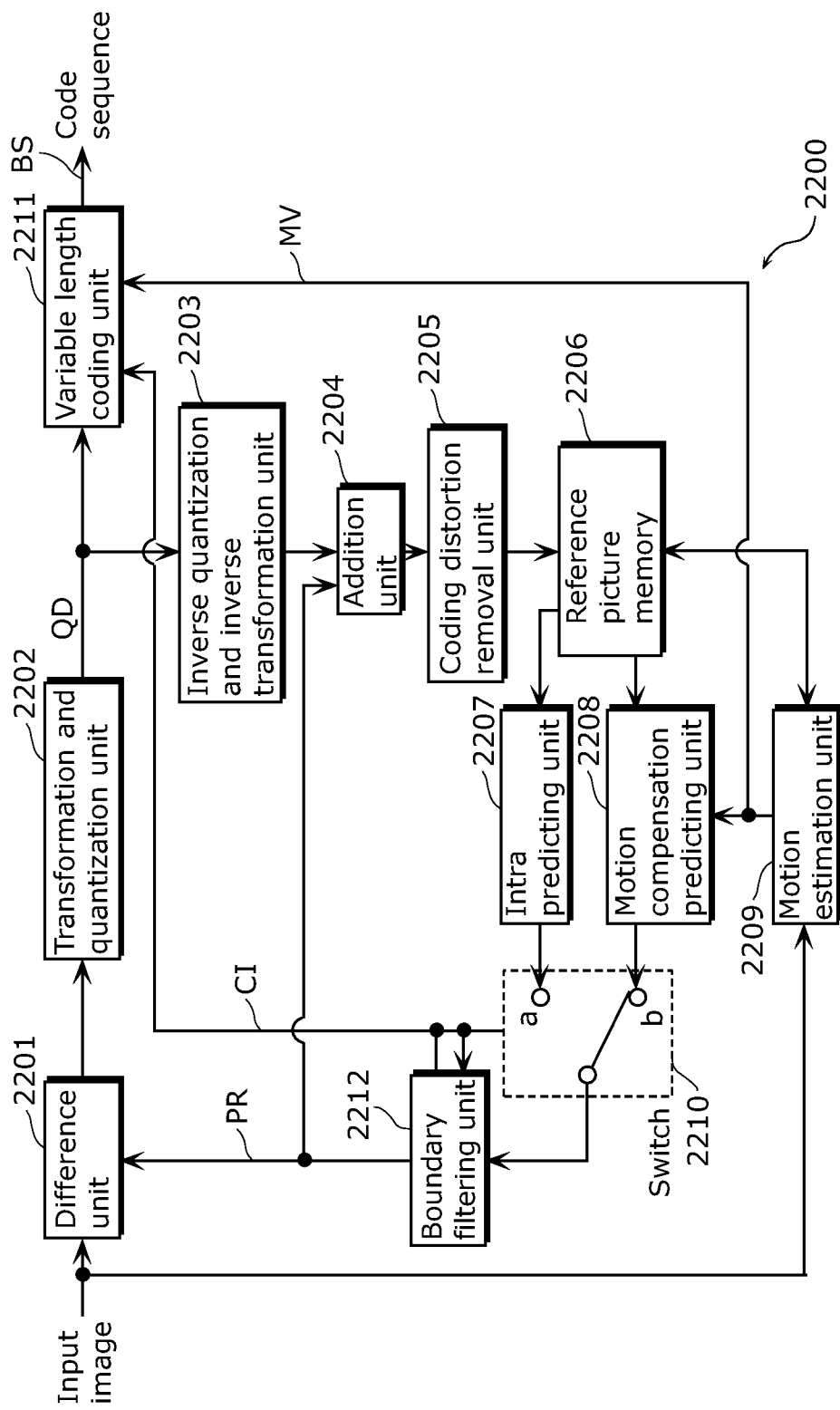
FIG. 22 is a block diagram showing a functional configuration of an image coding apparatus according to Embodiment 8 of the present invention.

FIG. 22 is a block diagram showing a functional configuration of an image coding apparatus according to Embodiment 8 of the present invention. As shown in FIG. 22, an image coding apparatus 2200 includes a difference unit 2201, a transformation and quantization unit 2202, an inverse quantization and inverse transformation unit 2203, an addition unit 2204, a coding distortion removal unit 2205, a reference picture memory 2206, an intra predicting unit 2207, a motion compensation predicting unit 2208, a motion estimation unit 2209, a switch 2210, a variable length coding unit 2211, and a boundary filtering unit 2212. The reference picture memory 2206 may be constituted as an external memory connected to the image coding apparatus 2200.

An input image is input to the image coding apparatus 2200. In the reference picture memory 2206, a decoded image of the coded image (reconstructed image) is stored, and this is used as a reference picture when the input image is coded.

It should be noted that the difference unit 2201 operates similarly to the difference unit 106, the transformation and quantization unit 2202 operates similarly to the transformation unit 107 and the quantization unit 108, the inverse quantization and inverse transformation unit 2203 operates similarly to the inverse quantization unit 110 and the inverse transformation unit 111, the addition unit 2204 operates similarly to the addition unit 112, the reference picture memory 2206 operates similarly to the reference picture memory 103, the boundary filtering unit 2212 operates similarly to the boundary filtering unit 105, and the motion estimation unit 2209 operates similarly to the motion estimation unit 102. Moreover, the motion compensation predicting unit 2208, the intra predicting unit 2207, and the switch 2210 operate similarly to the coding control unit 104 when a motion compensated image is generated as the prediction image MC.

The difference unit 2201 generates a difference image between a prediction image PR that is generated by a method to be described later and an input image, and then outputs the generated difference image to the transformation and quantization unit 2202. The transformation and quantization unit 2202 performs transformation and quantization processing on the input difference image to generate a quantized signal QD, and then outputs the generated quantized signal QD to the inverse quantization and inverse transformation unit 2203 and the variable length coding unit 2211. The inverse quantization and inverse transformation unit 2203 performs inverse quantization and inverse transformation on the input quantized signal QD to generate a decoded difference image, and then outputs the generated decoded difference image to the addition unit 2204. The addition unit 2204 adds the decoded difference image obtained from the inverse quantization and inverse transformation unit 2203 and the prediction image PR to generate a reconstructed image, and then outputs the generated reconstructed image to the coding distortion removal unit 2205.

Here, the coding distortion removal unit 2205 performs, on the boundary of the transform unit, coding distortion removal process (deblocking filter) (for example, filtering process expressed by Expression 4 is performed on the boundary of the transform unit). It should be noted that the coding distortion removal unit 2205 may skip the process.

The generation of the prediction image MC is divided into motion compensation prediction and inter-plane prediction and is switched by the switch 2210.

The generation of the prediction image MC by intra prediction will be described. The intra predicting unit 2207 obtains a reference picture from the reference picture memory 2206. The intra predicting unit 2207 performs, based on the obtained reference picture, intra prediction according to a predetermined method (for example, by extending the adjacent pixel to a horizontal or vertical direction) to generate the intra prediction image of the target block, and then outputs the intra prediction image to "a" of the switch 2210. When "a" is selected by the switch 2210, the intra prediction image is output to the boundary filtering unit 2212 as the prediction image MC. Furthermore, a method for partitioning the intra prediction is output to the boundary filtering unit 2212. When the boundary of the partitioned area of the intra prediction exists within the transform unit, the boundary filtering unit 2212 detects the boundary as the target boundary and then performs filtering process on the boundary.

The generation of the prediction image MC by motion compensation prediction will be described. The motion estimation unit 2209 estimates, from the reference picture, an area which corresponds to the prediction unit included in the target block. The motion estimation unit 2209 outputs the motion vector MV indicating the position of the estimated area to the motion compensation predicting unit 2208 and the variable length coding unit 2211. It should be noted that a weighted sum of (i) a sum of difference between the input image and the estimating target image in the reference picture and (ii) the motion vector can be used for a method for estimating an area. In this case, the motion estimation unit 2209 may search a position of the area which takes the minimum value in a search range of the predetermined reference picture (for example, in a unit of horizontal 32 pixels and vertical 16 pixels) and output the motion vector indicating the position of the searched area.

The motion compensation predicting unit 2208 picks out, for each prediction unit, an image in the reference picture indicated by the obtained motion vector MV and then outputs the image as the motion compensated image of the target block to "b" of the switch 2210.

When "b" is selected by the switch 2210, the motion compensated image is output to the boundary filtering unit 2212 as the prediction image MC. Furthermore, a method for partitioning the motion compensated image output to the boundary filtering unit 2212. In this case, the boundary filtering unit 2212 operates as similar to that in other embodiments.

The switch 2210 switches, according to a predetermined method, between outputting an intra prediction image as the prediction image MC and outputting a motion compensated image as the prediction image MC. In other words, the switch 2210 selects one of the intra prediction image and the motion compensated image as the prediction image MC. For example, the switch 2210 may compare the sum of the difference between the input image and the intra prediction image with the sum of the difference between the input image and the motion compensated image, and may output the image having a smaller sum of difference as the prediction image MC. The information about a method for generating the prediction image PR is output to the variable length coding unit 2211 as prediction image generation information CI.

It should be noted that when the filter information determined by the boundary filtering unit 2212 is added to a code sequence, the boundary filtering unit 2212 may output, to the variable length coding unit 2211, the filter information along with the prediction image generation information CI.

The variable length coding unit 2211 performs variable length coding on the quantized signal QD, the motion vector MV, and the prediction image generation information CI, and then output them as the coded stream BS.

By taking such a configuration, it is possible to perform filtering process on a part of the boundary of the prediction unit located within the transform unit described in Embodiment 1 in the intra prediction. With this, at a time of intra prediction, a difference signal can be smaller and a code amount can be reduced.

It should be noted that the image coding apparatus 2200 includes both the intra predicting unit 2207 and the motion compensation predicting unit 2208. But the image coding apparatus 2200 may include only the intra predicting unit 2207. In this case, the motion estimation unit 2209 and the switch 2210 are not necessary.

Embodiment 9

In Embodiment 9 of the present invention, in the intra prediction image, when the boundary of the prediction image exists within the transform unit, an image decoding method for performing filtering process on the boundary as similarly to the motion compensated image will be described.

Figure 23:
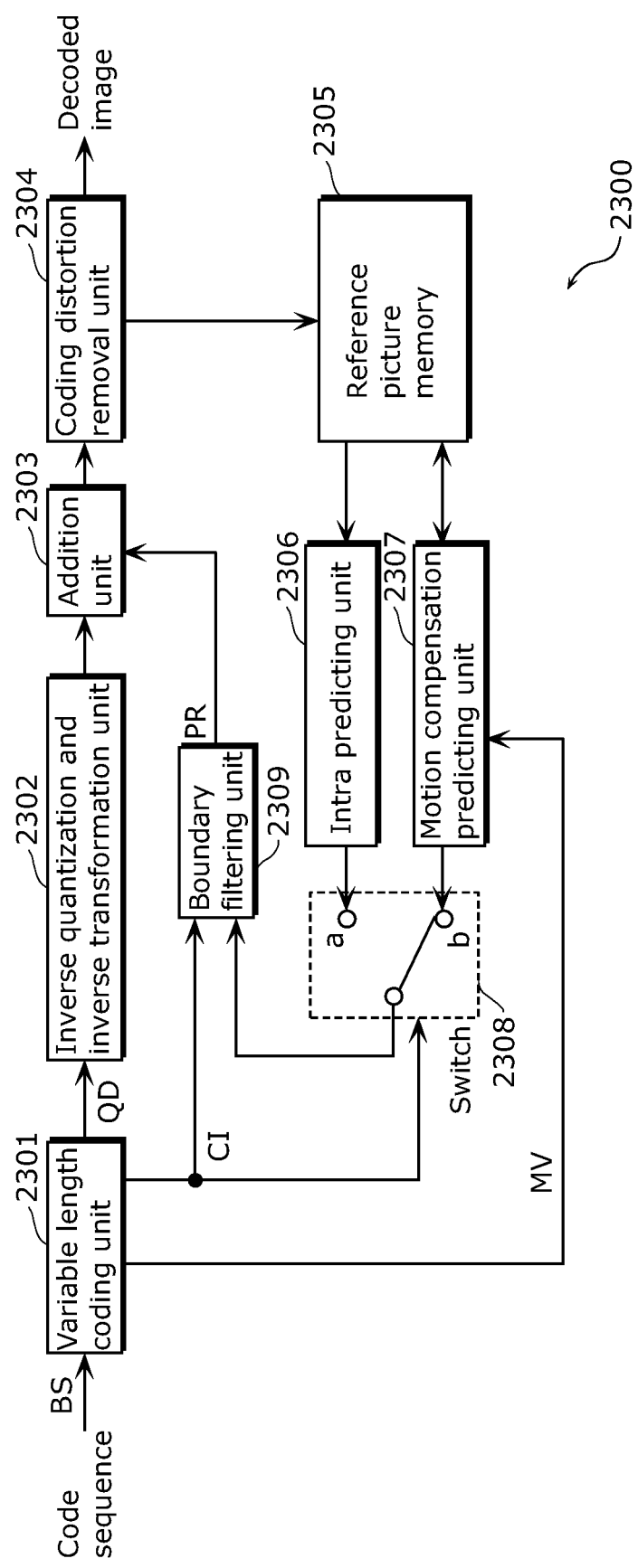
FIG. 23 is a block diagram showing a functional configuration of an image decoding apparatus according to Embodiment 9 of the present invention.

FIG. 23 is a block diagram showing a functional configuration of an image decoding apparatus according to Embodiment 9 of the present invention. As shown in FIG. 23, the image decoding apparatus 2300 includes a variable length decoding unit 2301, an inverse quantization and inverse transformation unit 2302, and an addition unit 2303, a coding distortion removal unit 2304, a reference picture memory 2305, an intra predicting unit 2306, a motion compensation predicting unit 2307, a switch 2308, and a boundary filtering unit 2309. The reference picture memory 2305 may be constituted as an external memory connected to the image decoding apparatus 2300.

Here, in the reference picture memory 2305, a decoded image is already stored, and this is used as a reference picture when the input image is decoded.

It should be noted that the inverse quantization and inverse transformation unit 2302 operates similarly to the inverse quantization unit 902 and the inverse transformation unit 903, the addition unit 2303 operates similarly to the addition unit 904, the reference picture memory 2305 operates similarly to the reference picture memory 908, and the boundary filtering unit 2309 operates similarly to the boundary filtering unit 906. The motion compensation unit 907 is implemented as the motion compensation predicting unit 2307 and the reference picture memory 2305, the decoding control unit 905 is implemented as the motion compensation predicting unit 2307, the intra predicting unit 2306, and the switch 2308.

A code sequence BS is input to the image decoding apparatus 2300. The variable length decoding unit 2301 performs variable length decoding on the code sequence BS and then obtains the prediction image generation image CI, the motion information MV, and the quantized signal QD. The variable length decoding unit 2301 outputs the prediction image generation information CI to the switch 2308 and the boundary filtering unit 2309, outputs the motion information MV to the motion compensation predicting unit 2307, and outputs the quantized signal QD to the inverse quantization and inverse transformation unit 2302.

The inverse quantization and inverse transformation unit 2302 performs inverse quantization and inverse transformation on the quantized signal QD to generate a decoded difference image, and then outputs the decoded difference image to the addition unit 2303. The addition unit 2303 adds the decoded difference image and the prediction image PR to be described later and then outputs the added result to the coding distortion removal unit 2304.

The coding distortion removal unit 2304 performs coding distortion removal on the input signal and then outputs it as the decoded image with respect to the reference picture memory 2305.

Here, the coding distortion removal unit 2304 performs, on the boundary of the transform unit, coding distortion removal (deblocking filter) (for example, filtering process expressed by Expression 4 is performed on the boundary of the transform unit), and may skip the coding distortion removal process.

It should be noted that the method for generating the prediction image, based on the prediction image generation information CI, similarly to the image coding apparatus described in Embodiment 8, based on the reference picture obtained from the reference picture memory 2305, is generated by the intra predicting unit 2306, or the motion information MV and the motion compensation predicting unit 2307. The generated image is output to the boundary filtering unit 2309, and filtering process is performed on the prediction image boundary within the transform processing unit. It should be noted that when the filter information is coded with respect to a code sequence, decoding is performed by the variable length decoding unit 2301, input is performed to the boundary filtering unit 2309 along with the prediction image generation information CI, and filtering process is performed based on the filter information.

With this configuration, a code sequence in which the filtering process is performed also with respect to the intra prediction on the prediction boundary within the transform processing unit described in Embodiment 8 can be accurately decoded.

Embodiment 10

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of embodiments and systems using thereof will be described.

Figure 24:
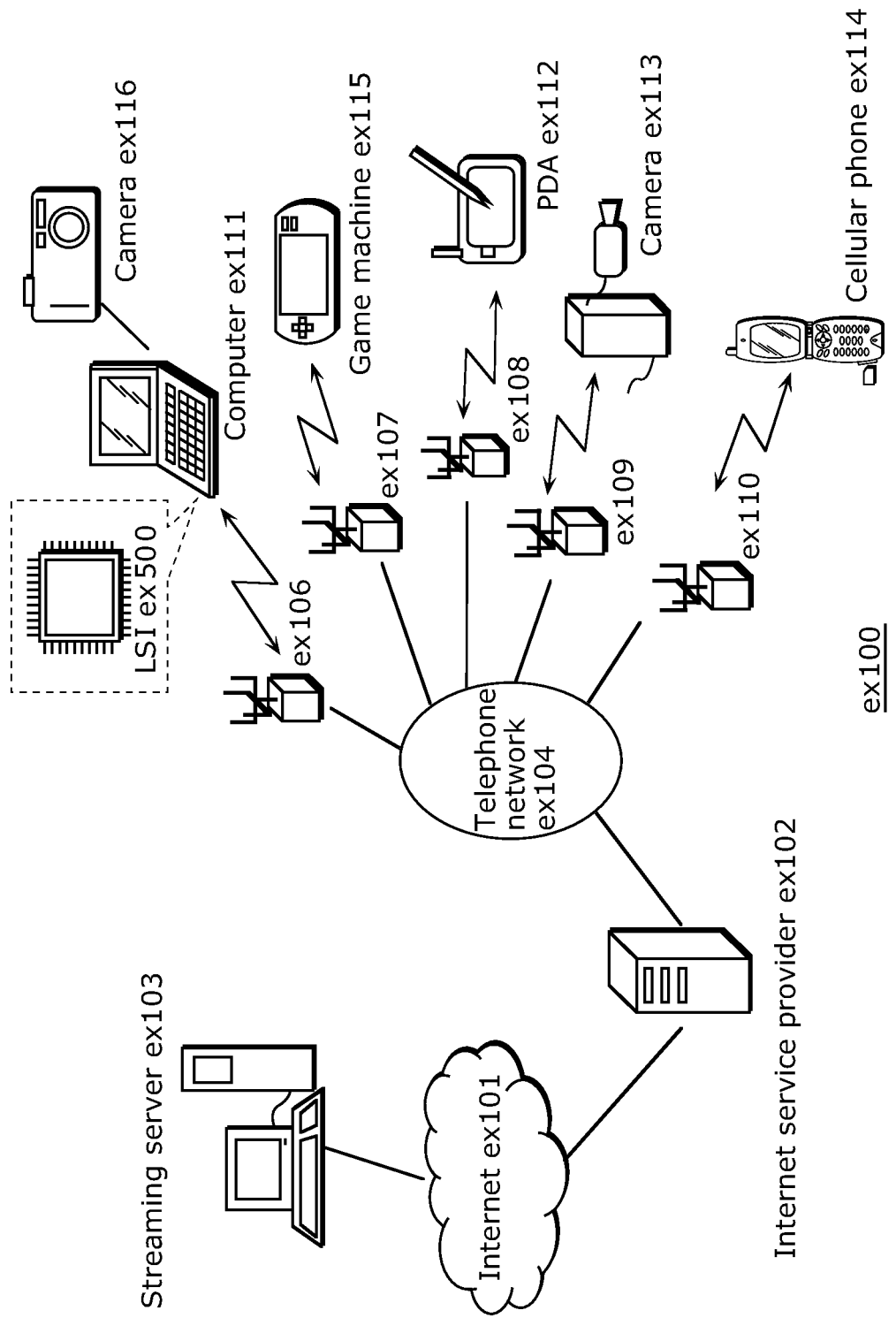
FIG. 24 is an overall configuration of a content providing system which implements content distribution services.

FIG. 24 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 24, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 25:
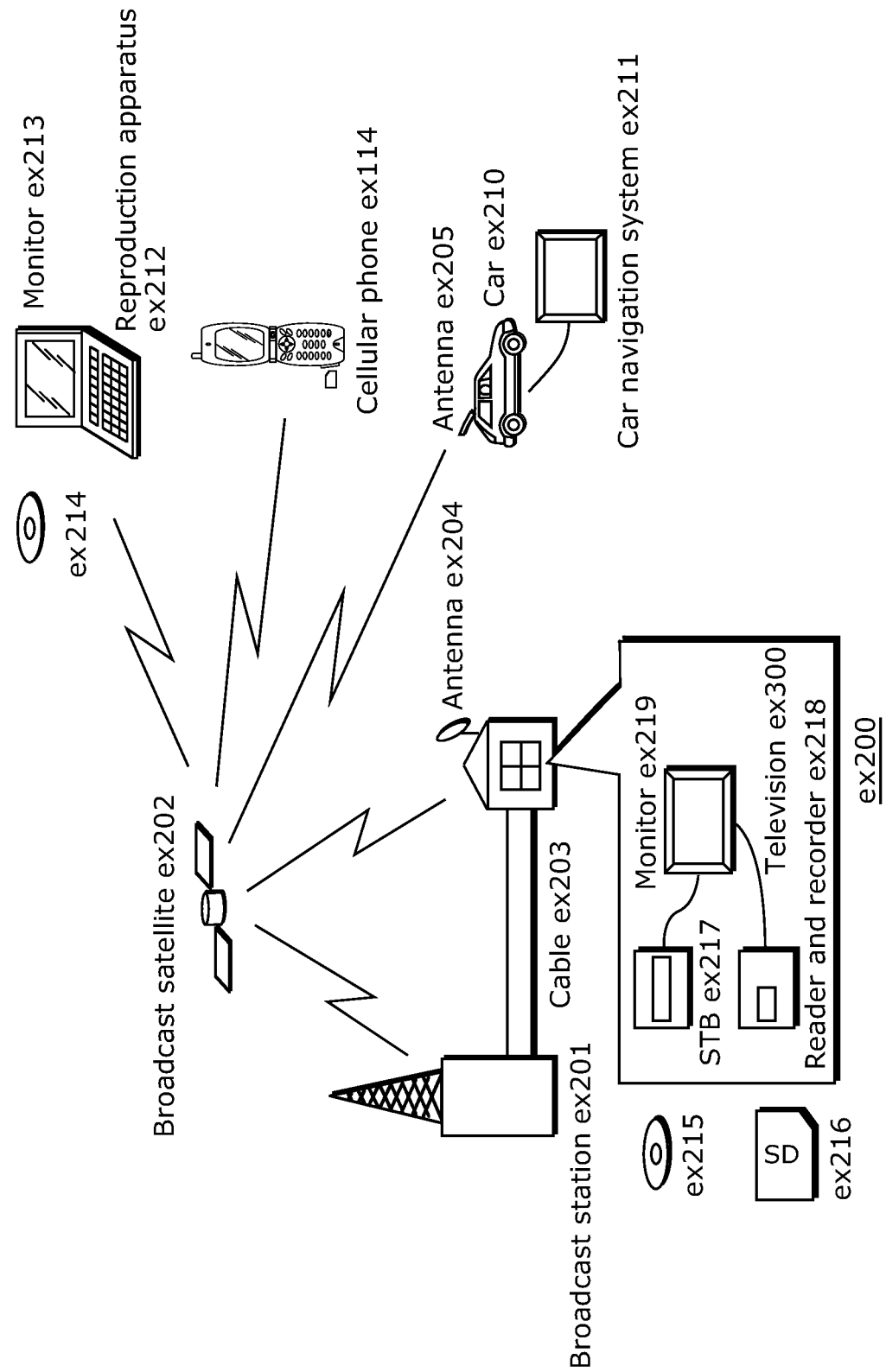
FIG. 25 is an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 25. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording medium ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 26:
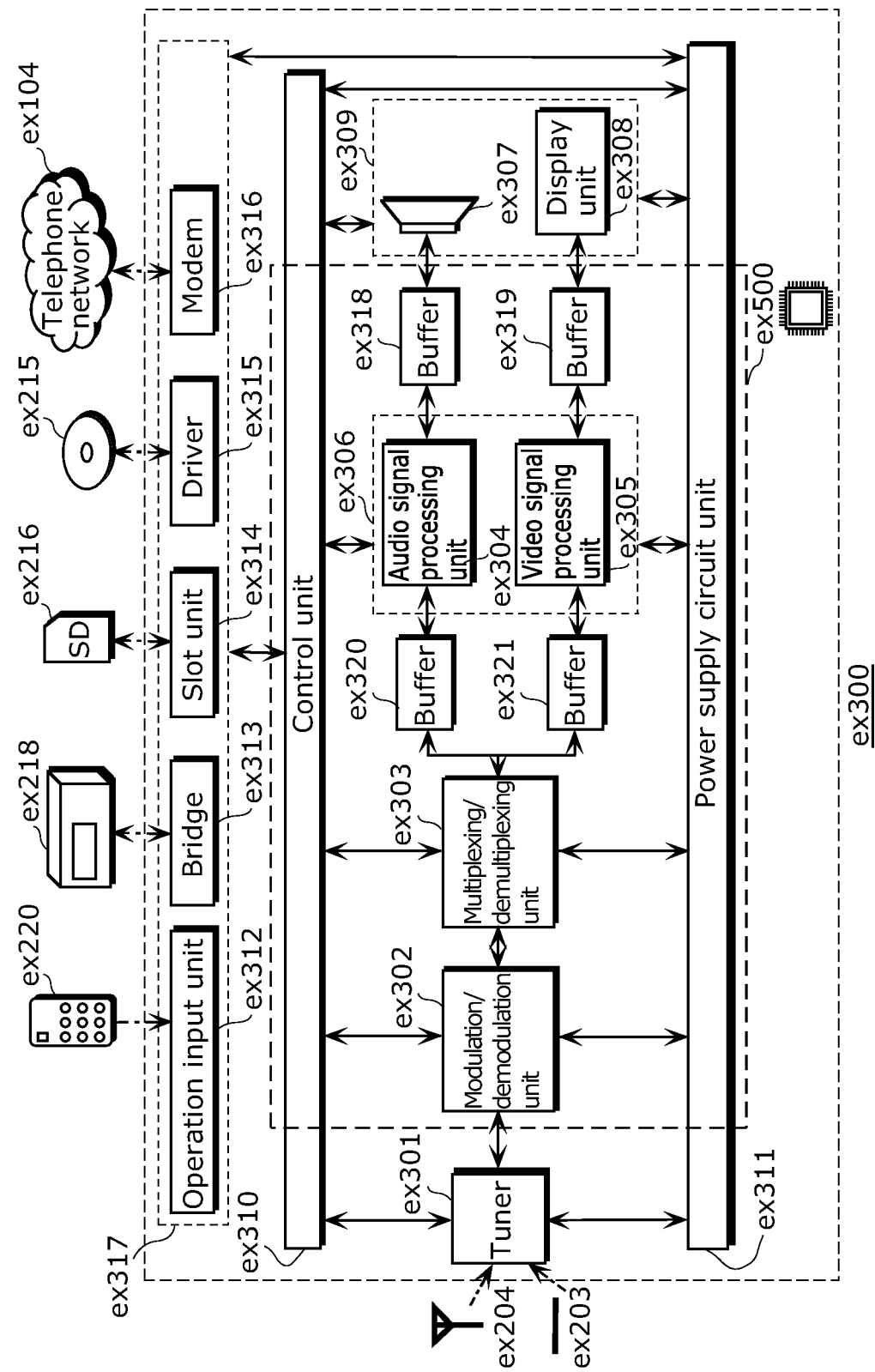
FIG. 26 is a block diagram showing an example of a configuration of a television.

FIG. 26 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 27:
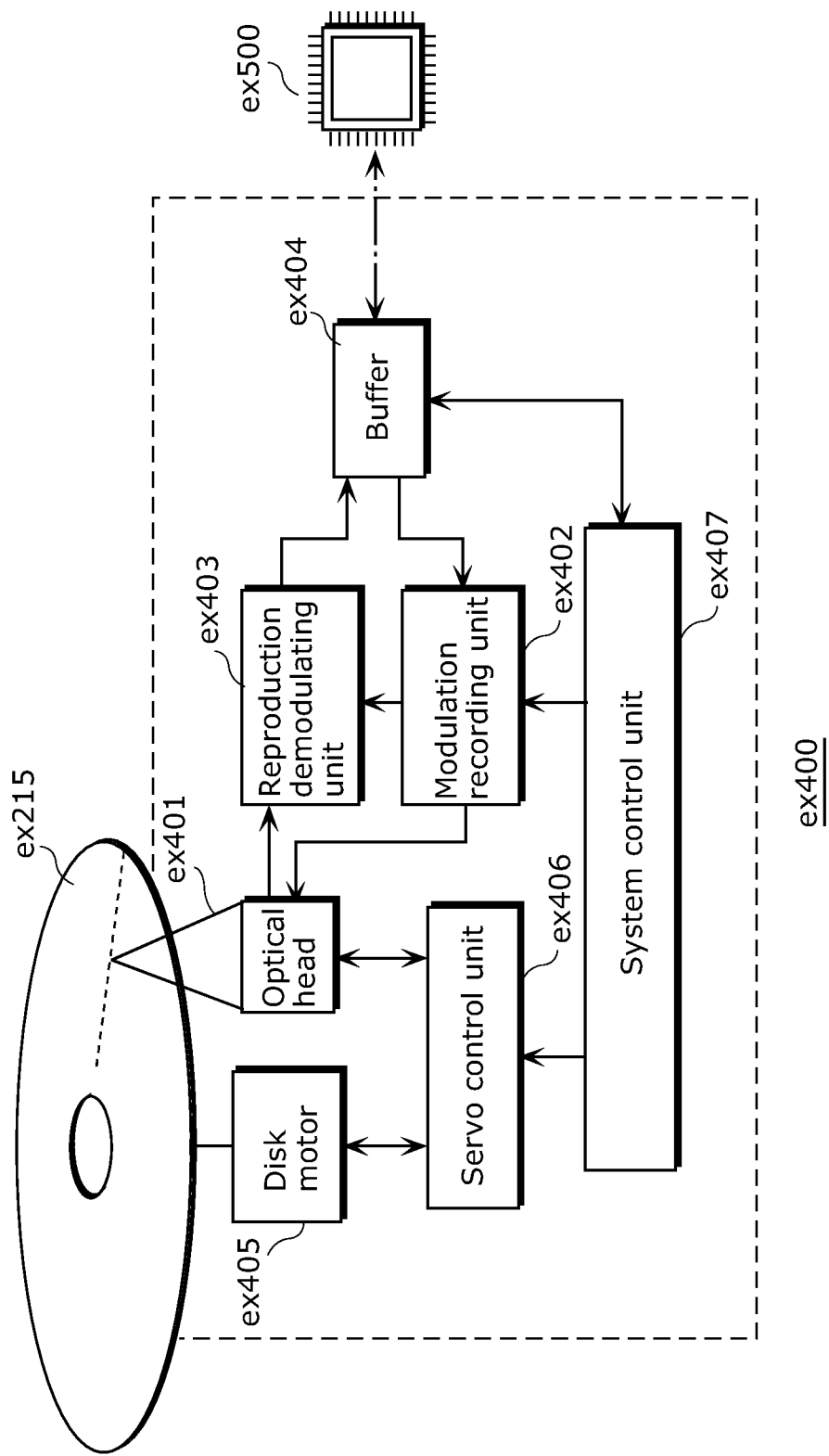
FIG. 27 is a block diagram illustrating an example of a configuration of an information reproducing/recording unit that reads and writes information from and on a recording medium that is an optical disk.

As an example, FIG. 27 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 28:
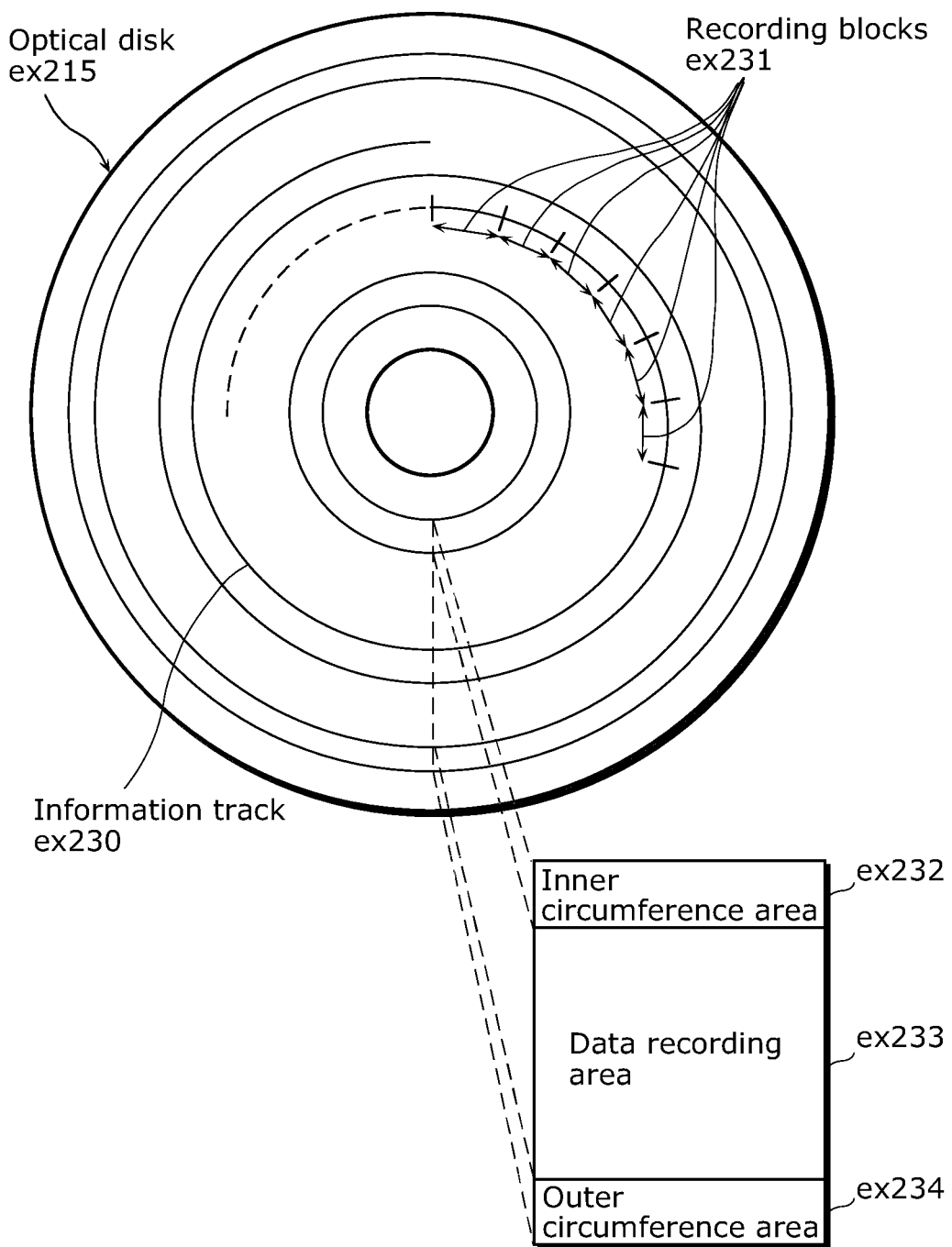
FIG. 28 is a diagram showing a configuration of a recording medium that is an optical disk.

FIG. 28 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 26. The same will be true for the configuration of the computer ex111, the cellular phone ex114, and others. Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 11

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 30:
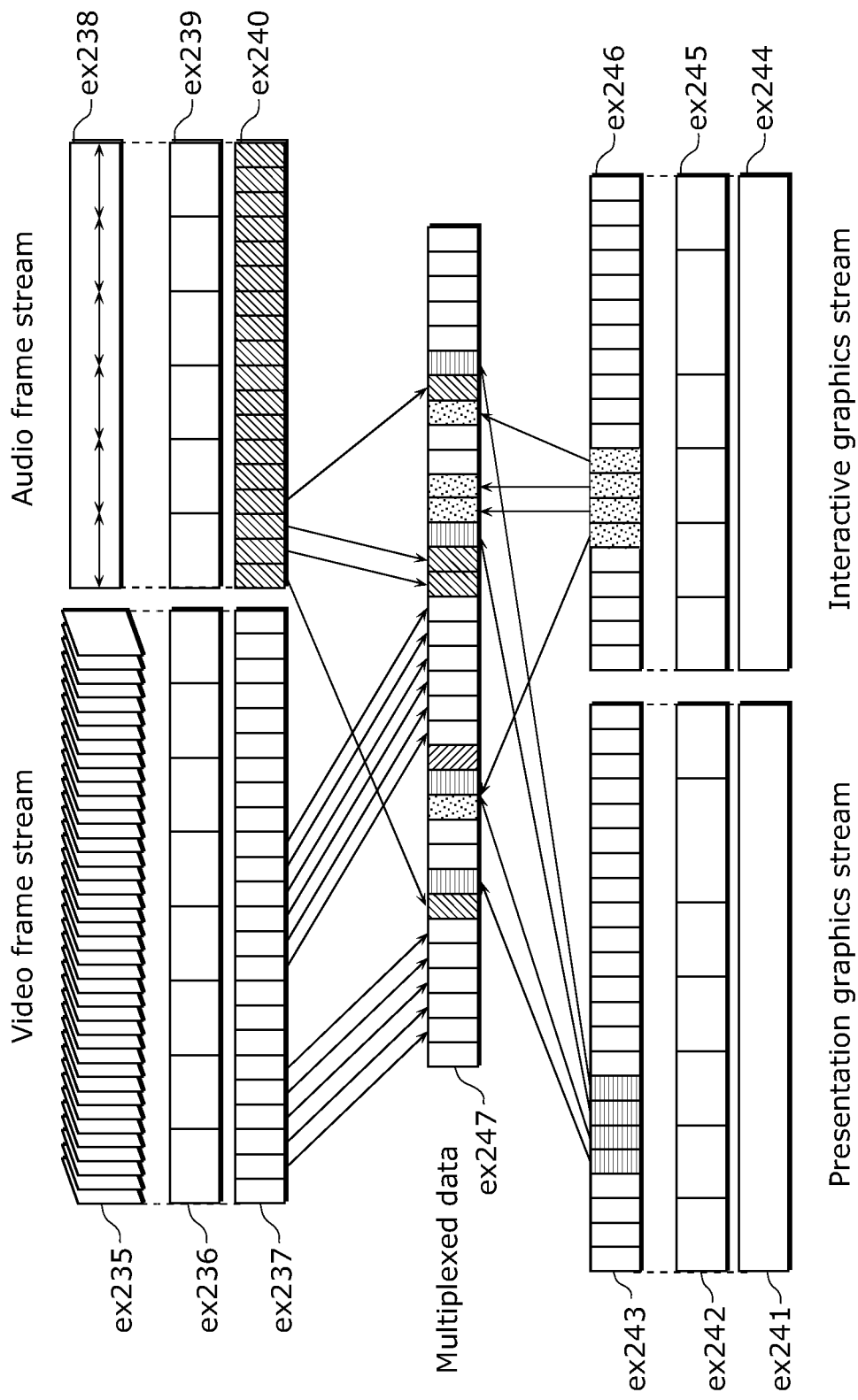
FIG. 30 is a diagram showing how to multiplex each stream in multiplex data.

FIG. 30 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 31:
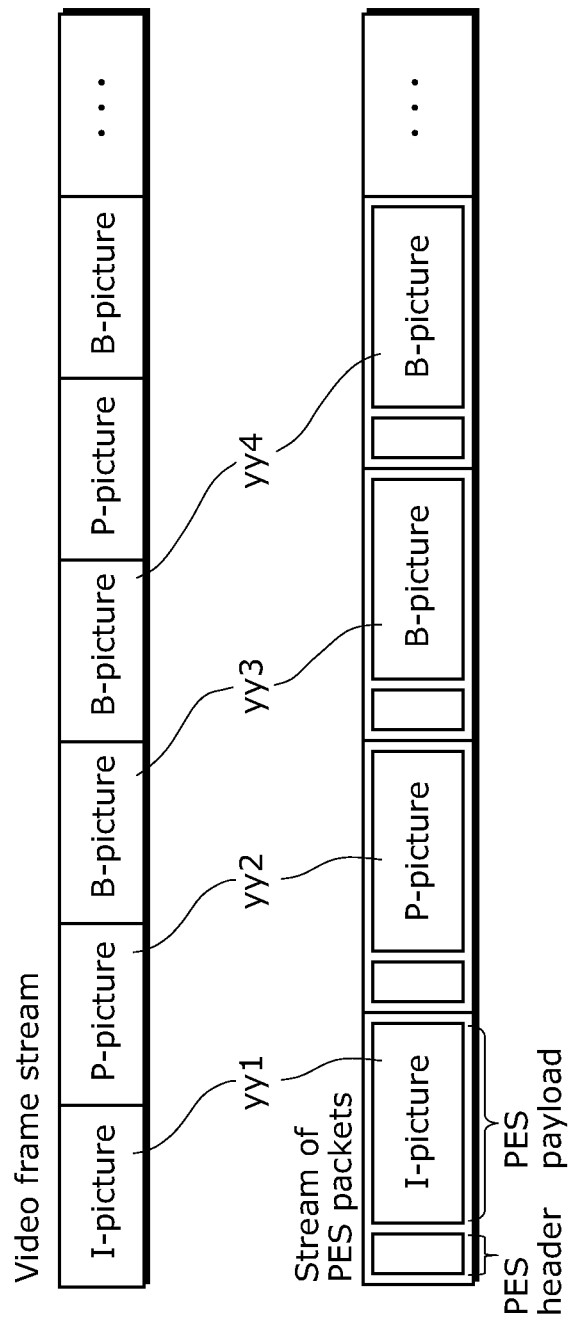
FIG. 31 is a diagram showing how a video stream is stored in a stream of PES packets in more detail.

FIG. 31 illustrates how a video stream is stored in a stream of PES packets in more detail. The first bar in FIG. 17 shows a video frame stream in a video stream. The second bar shows the stream of PES packets. As indicated by arrows denoted as yy1, yy2, yy3, and yy4 in FIG. 17, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 33 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 34:
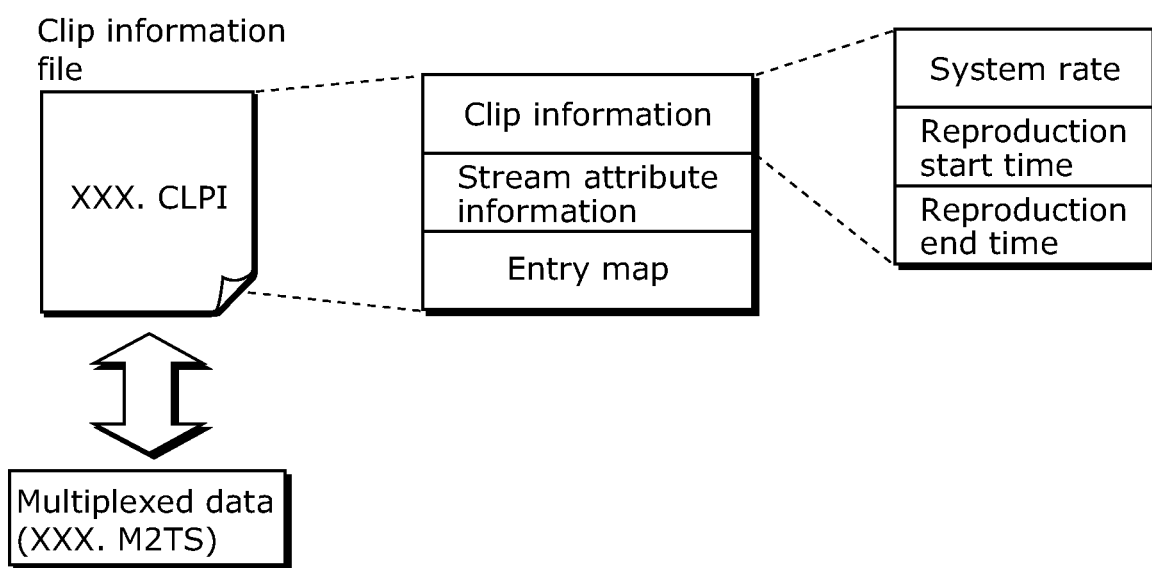
FIG. 34 is a diagram showing an internal structure of multiplexed data information.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 35:
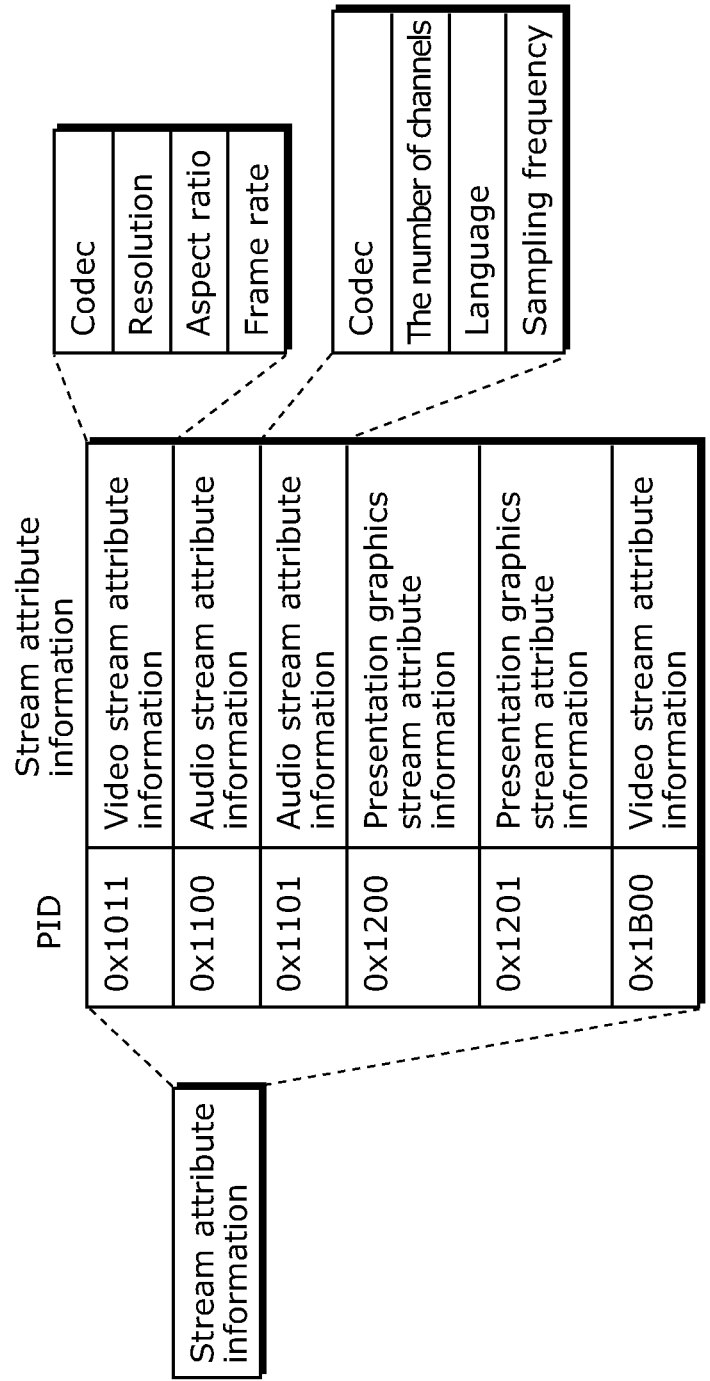
FIG. 35 is a diagram showing an internal structure of stream attribute information.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 36:
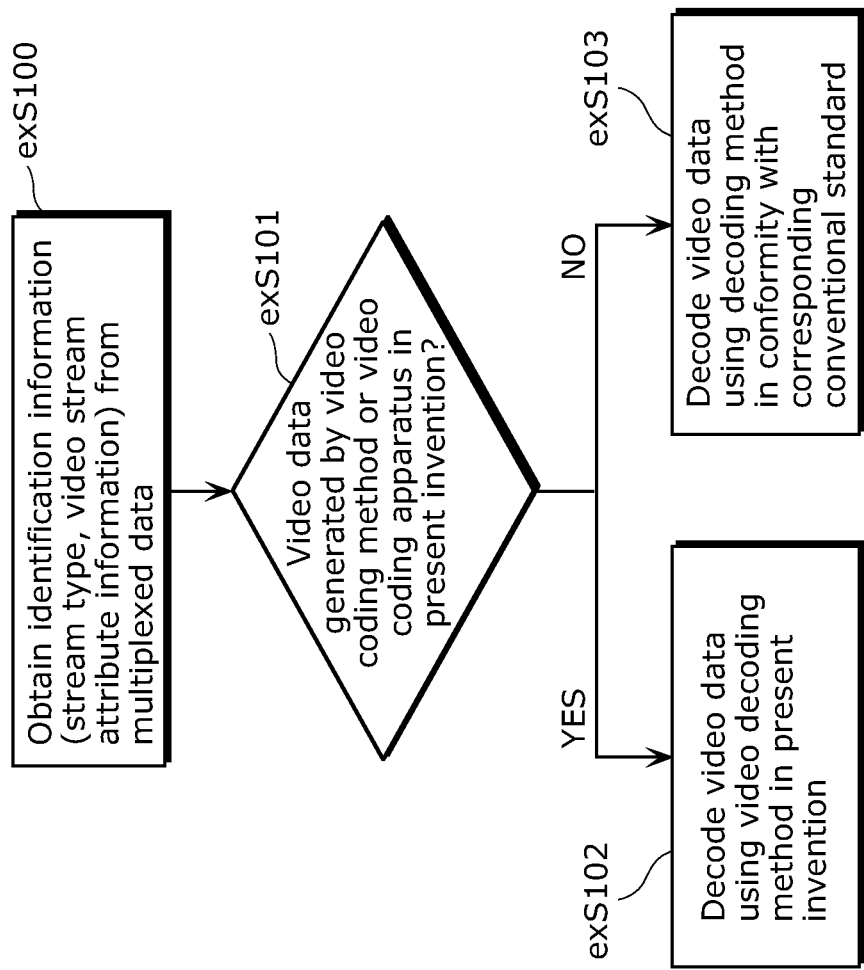
FIG. 36 is a diagram showing steps for identifying video data.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 12

Figure 37:
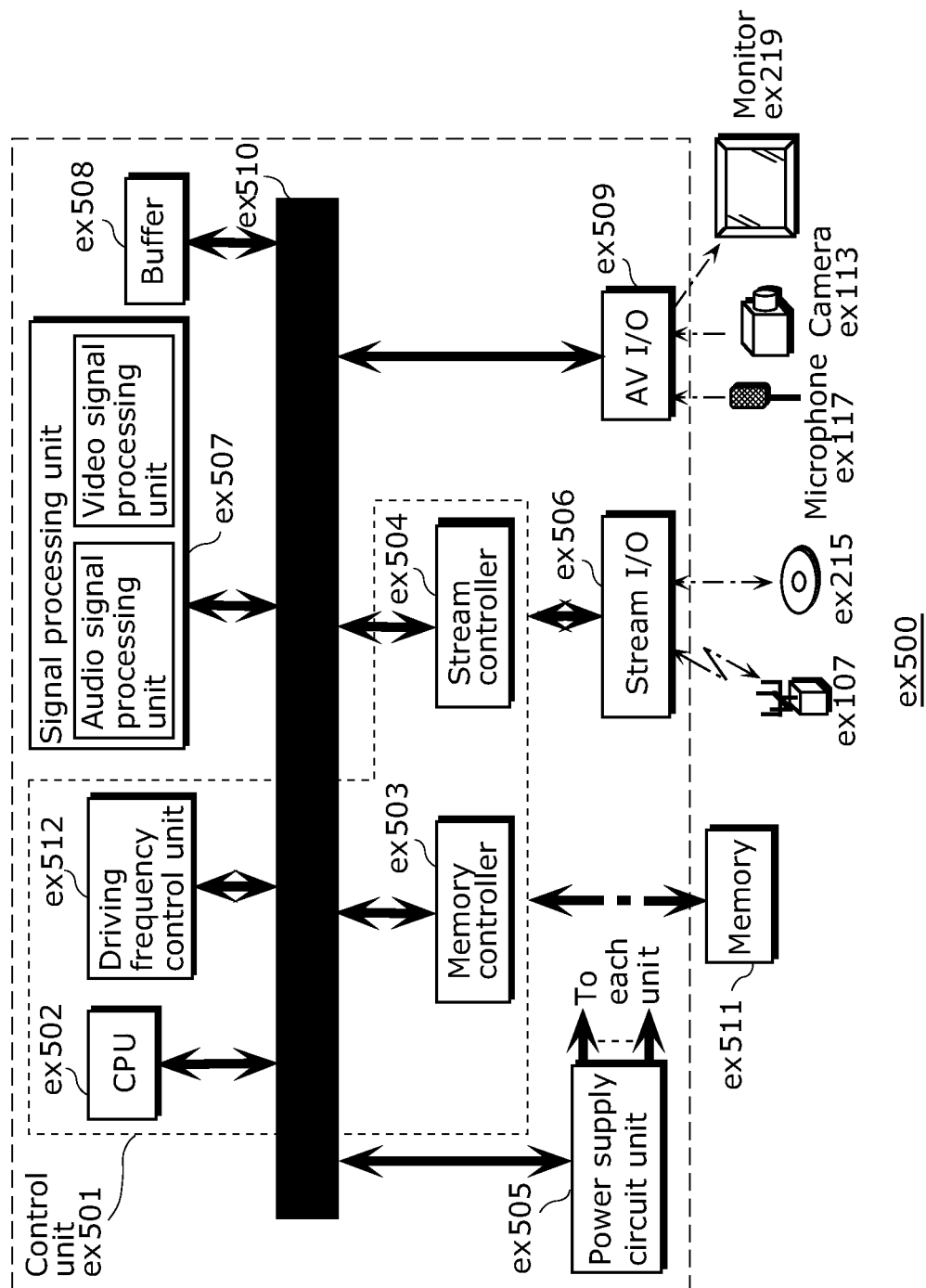
FIG. 37 is a block diagram showing an example of a configuration of an integrated circuit for implementing the moving picture coding method and the moving picture decoding method according to each of the embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can increase the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 13

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 38:
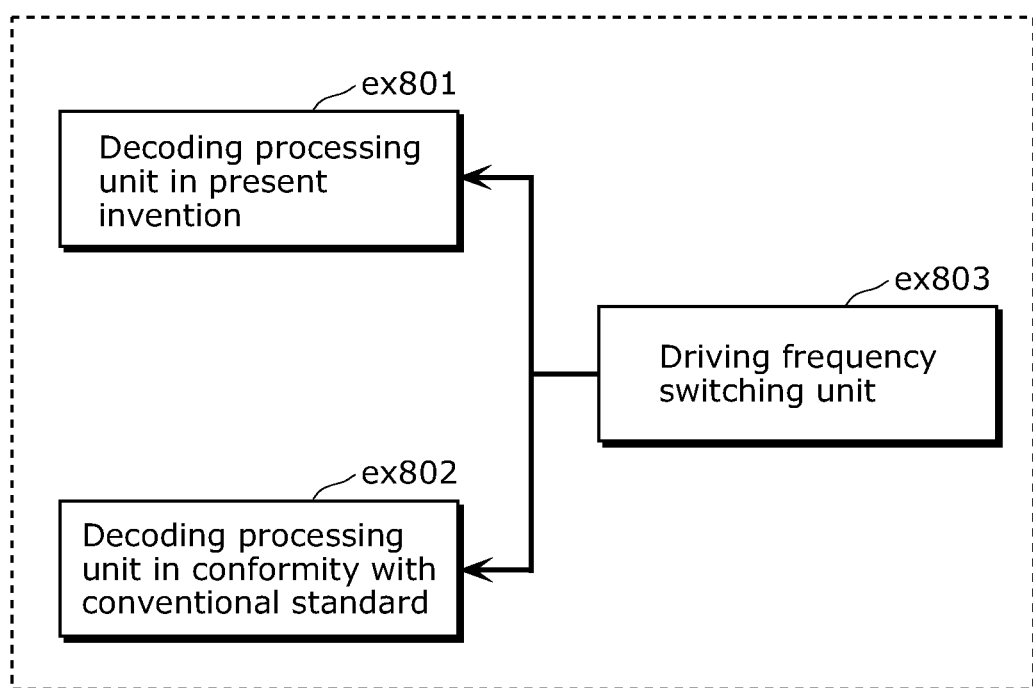
FIG. 38 is a diagram showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figure 40:
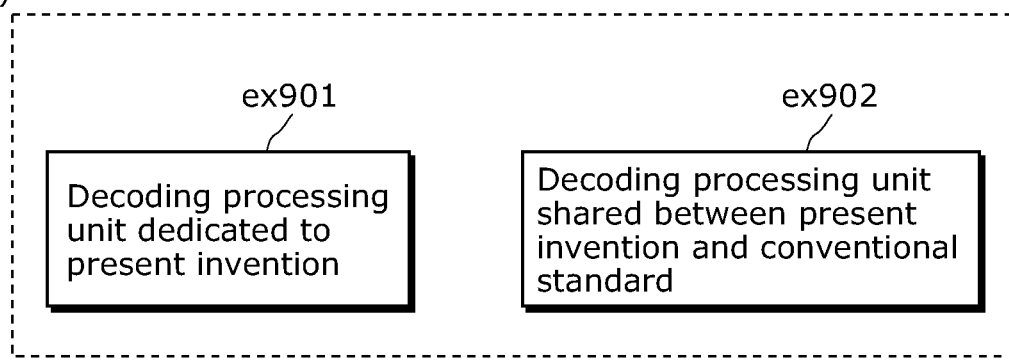
FIG. 40 is a diagram showing an example of a look-up table in which video data standards are associated with driving frequencies.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment 11 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

Figure 39:
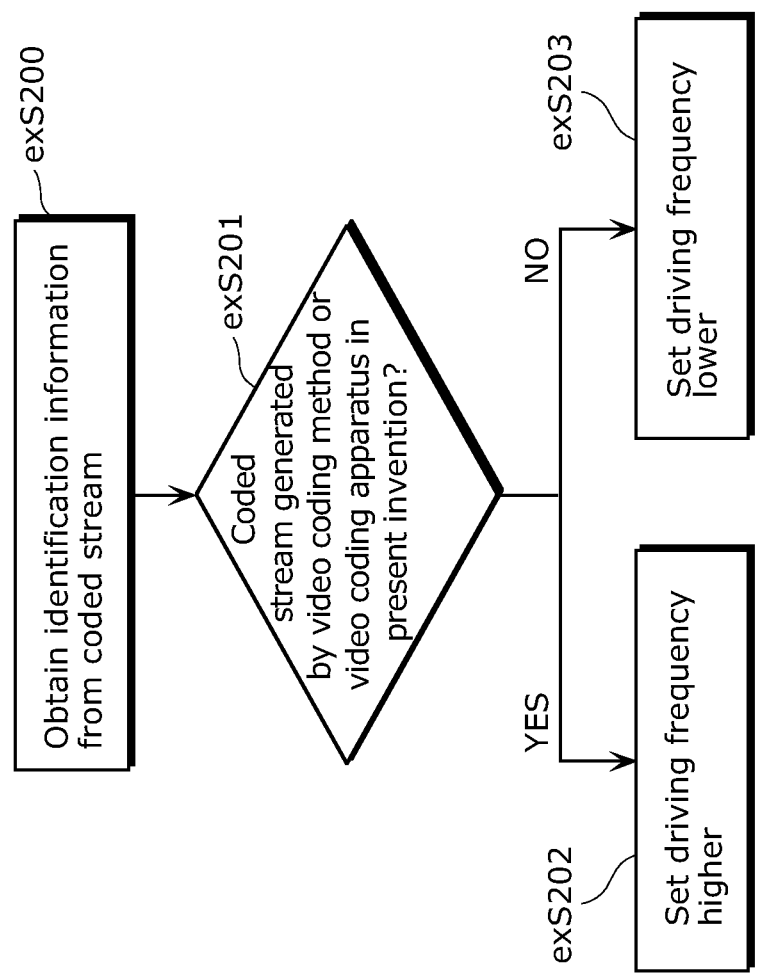
FIG. 39 is a diagram showing steps for identifying video data and switching between driving frequencies.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be increased by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, when the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be increased by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 14

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 41:
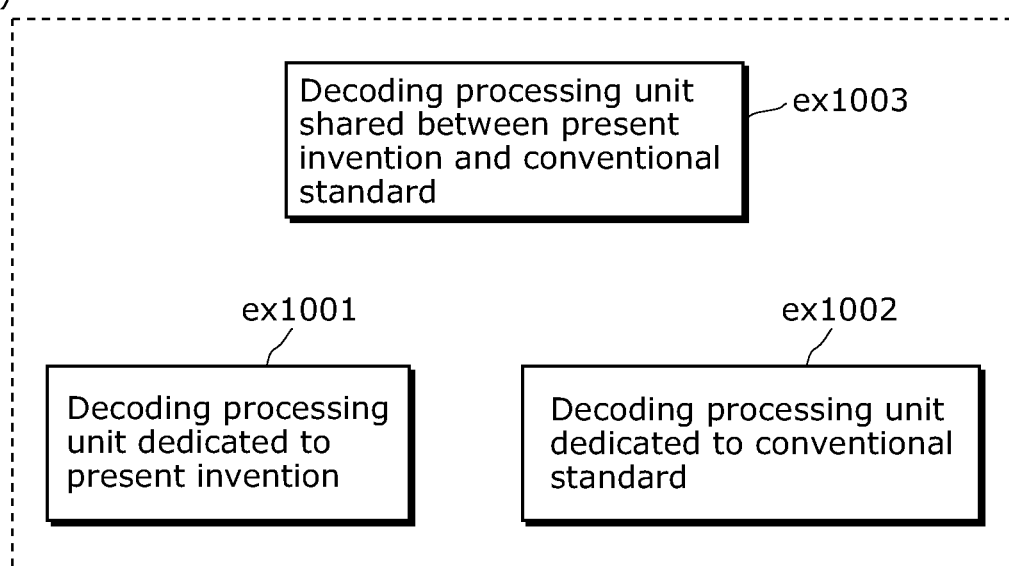
FIG. 41, in (a), is a diagram showing an example of a configuration for sharing a module of a signal processing unit, while FIG. 41, in (b), is a diagram showing another example of a configuration for sharing a module of the signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in (a) of FIG. 41 shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in (b) of FIG. 41 shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

The present invention can help increase coding efficiency, and is applicable to a variety of uses such as storage, transmission, and communication. For example, the present invention can be applicable to and is highly useful for high-resolution information display devices and imaging devices such as a television receiver, a digital video recorder, a car navigation system, a mobile phone, a digital camera.

REFERENCE SIGNS LIST 100, 1300, 2200 Image coding apparatus
101, 1301 Frame memory
102, 1302, 2209 Motion estimation unit
103, 908, 1303, 1708, 2206, 2305 Reference picture memory
104, 1304 Coding control unit
105, 906, 1305, 1706, 2212, 2309 Boundary filtering unit
106, 1306, 2201 Difference unit
107, 1307 Transformation unit
108, 1308 Quantization unit
109, 1309, 2211 Variable length coding unit
110, 902, 1310, 1702 Inverse quantization unit
111, 903, 1311, 1703 Inverse transformation unit
112, 904, 1312, 1704, 2204, 2303 Addition unit
900, 1700, 2300 Image decoding apparatus
901, 1701, 2301 Variable length decoding unit
905, 1705 Decoding control unit
907, 1707 Motion compensation unit
1313 Filter information description unit
1709 Filter information decoding unit
2210, 2308 Switch
2202 Transformation and quantization unit
2203, 2302 Inverse quantization and inverse transformation unit
2205, 2304 Coding distortion removal unit
2207, 2306 Intra predicting unit
2208, 2307 Motion compensation predicting unit

The invention claimed is:

1. An image coding method for coding an input image per block to generate a coded image signal, the image coding method comprising:
performing prediction process on prediction units each of which is an area obtained by partitioning a target block, to generate a prediction image of the target block;
performing boundary filtering process on a boundary of each of the prediction units in the generated prediction image, when the boundary is located within a transform unit, the transform unit being an area obtained by partitioning the target block and being a processing unit for frequency transform;
calculating a difference between the prediction image after the filtering process and the input image, to generate a difference image of the target block; and
performing frequency transform on the difference image for each of the transform units to generate the coded image signal.

2. The image coding method according to claim 1, wherein no filtering process is performed on the boundary of the transform unit.

3. The image coding method according to claim 1, further comprising
describing, in the coded image signal, filter information indicating a method for the boundary filtering process.

4. The image coding method according to claim 1, wherein the performing of prediction process includes:
performing motion estimation for each of the prediction units to obtain a motion vector for the prediction unit; and
performing motion compensation for each of the prediction units based on the obtained motion vector, to generate a motion compensated image of the target block as the prediction image.

5. The image coding method according to claim 1, wherein the performing of prediction process includes intra prediction for each of the prediction units based on a reconstructed image of a coded block, to generate an intra prediction image of the target block as the prediction image.

6. The image coding method according to claim 1, wherein the performing of prediction process includes:
performing motion estimation for each of the prediction units to obtain a motion vector for the prediction unit;
performing motion compensation for each of the prediction units based on the obtained motion vector, to generate a motion compensated image of the target block;

performing intra prediction for each of the prediction units based on a reconstructed image of a coded block, to generate an intra prediction image of the target block; and comparing the motion compensated image with the intra prediction image to select one of the motion compensated image and the intra prediction image as the prediction image.

7. An image coding apparatus for coding an input image per block to generate a coded image signal, the image coding apparatus comprising:

a processor; and a non-transitory memory having a computer program recorded thereon, the computer program when executed by the processor is operable to cause the image coding apparatus to perform operations comprising:

performing prediction process on prediction units each of which is an area obtained by partitioning a target block, to generate a prediction image of the target block;

perform filtering process on a boundary of each of the prediction units in the generated prediction image, when the boundary is located within a transform unit, the transform unit being an area obtained by partitioning the target block and being a processing unit for frequency transform;

calculating a difference between the prediction image after the filtering process and the input image, to generate a difference image of the target block; and performing frequency transform on the difference image for each of the transform units to generate the coded image signal.

8. An image decoding method for decoding a coded signal obtained by coding an input image per block, the image decoding method comprising:

receiving the coded image signal;

performing prediction process on prediction units each of which is an area obtained by partitioning a target block, to generate a prediction image of the target block;

performing boundary filtering process on a boundary of each of the prediction units in the generated prediction image, when the boundary is located within a transform unit, the transform unit being an area obtained by partitioning the target block and being a processing unit for frequency transform;

calculating a difference between the prediction image after the filtering process and the input image, to generate a difference image of the target block; and performing an inverse frequency transform on the difference image for each of the transform units to generate a decoded image signal.

9. The image decoding method according to claim 8, wherein no filtering process is performed on the boundary of the transform unit.

10. The image decoding method according to claim 8, further comprising describing, in the coded image signal, filter information indicating a method for the boundary filtering process.

11. The image decoding method according to claim 8, wherein the performing of prediction process includes:

performing motion estimation for each of the prediction units to obtain a motion vector for the prediction unit; and performing motion compensation for each of the prediction units based on the obtained motion vector, to generate a motion compensated image of the target block as the prediction image.

12. The image decoding method according to claim 8, wherein the performing of prediction process includes intra prediction for each of the prediction units based on a reconstructed image of a coded block, to generate an intra prediction image of the target block as the prediction image.

13. The image decoding method according to claim 8, wherein the performing of prediction process includes:

performing motion estimation for each of the prediction units to obtain a motion vector for the prediction unit;

performing motion compensation for each of the prediction units based on the obtained motion vector, to generate a motion compensated image of the target block;

performing intra prediction for each of the prediction units based on a reconstructed image of a coded block, to generate an intra prediction image of the target block; and comparing the motion compensated image with the intra prediction image to select one of the motion compensated image and the intra prediction image as the prediction image.

14. An image decoding apparatus for decoding a coded image signal obtained by coding an input image per block, the image decoding apparatus comprising:

a processor; and a non-transitory memory having a computer program recorded thereon, the computer program when executed by the processor is operable to cause the image decoding apparatus to perform operations comprising:

receiving the coded image signal;

performing prediction process on prediction units each of which is an area obtained by partitioning a target block, to generate a prediction image of the target block;

performing boundary filtering process on a boundary of each of the prediction units in the generated prediction image, when the boundary is located within a transform unit, the transform unit being an area obtained by partitioning the target block and being a processing unit for frequency transform;

calculating a difference between the prediction image after the filtering process and the input image, to generate a difference image of the target block; and performing an inverse frequency transform on the difference image for each of the transform units to generate a decoded image signal.

* * * * *